United States Patent
Burns et al.

(10) Patent No.: US 7,616,577 B2
(45) Date of Patent: *Nov. 10, 2009

(54) METHOD AND SYSTEM FOR CONNECTION VERIFICATION

(75) Inventors: David J. Burns, Ottawa (CA); Norman J. Robertson, Kanata (CA); Frank Tony Gorenc, Burlington (CA); Manuel Lopes Branco, Mississauga (CA)

(73) Assignee: IXIA, Calabasas, CA (US)

( * ) Notice: Subject to any disclaimer, the term of this patent is extended or adjusted under 35 U.S.C. 154(b) by 791 days.

This patent is subject to a terminal disclaimer.

(21) Appl. No.: 11/002,078

(22) Filed: Dec. 3, 2004

(65) Prior Publication Data

US 2005/0135392 A1 Jun. 23, 2005

Related U.S. Application Data

(63) Continuation of application No. PCT/CA2004/001740, filed on Sep. 24, 2004, which is a continuation-in-part of application No. 10/670,261, filed on Sep. 26, 2003, now Pat. No. 7,433,450.

(51) Int. Cl.
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. .................. 370/241; 370/248; 370/401

(58) Field of Classification Search ................ 370/241, 370/242, 244, 248, 252, 400, 401
See application file for complete search history.

(56) References Cited

U.S. PATENT DOCUMENTS 5,619,489 A 4/1997 Chang (Continued)

FOREIGN PATENT DOCUMENTS

CA 2338682 A1 12/2000

(Continued)

OTHER PUBLICATIONS

Non-Final Office Action dated Dec. 4, 2007 for U.S. Appl. No. 10/670,261.

(Continued)

*Primary Examiner*—Kevin C Harper
(74) *Attorney, Agent, or Firm*—SoCal IP Law Group LLP; Steven C. Sereboff; John E. Gunther

(57) ABSTRACT

The present invention provides a method and system for connection verification. An embodiment includes a DSL based system, with a tester resident at a central office respective to a DSLAM. When a problem is encountered by a subscriber, the tester can be readily connected to the DSLAM to allow performance of tests on the connection between the tester, the DSLAM and the Internet. If such tests are successful, then service provider can eliminate that portion of the link as the source of the connectivity problem. If unsuccessful, the service provider can repair that portion of the connection, and thereby potentially obviate the need to send a technician to the subscriber premises.

46 Claims, 16 Drawing Sheets

U.S. PATENT DOCUMENTS

| | | | |
|---|---|---|---|
| 5,796,953 | A | 8/1998 | Zey |
| 5,835,565 | A | 11/1998 | Smith |
| 5,835,566 | A | 11/1998 | Cowgill |
| 5,838,919 | A | 11/1998 | Schwaller et al. |
| 5,933,475 | A | 8/1999 | Coleman |
| 5,982,852 | A | 11/1999 | Schwartz |
| 6,031,528 | A | 2/2000 | Langfahl, Jr. |
| 6,189,031 | B1 | 2/2001 | Badger |
| 6,201,853 | B1 | 3/2001 | Butler |
| 6,212,258 | B1 | 4/2001 | Bella et al. |
| 6,278,769 | B1 | 8/2001 | Bella |
| 6,363,056 | B1 | 3/2002 | Beigi et al. |
| 6,397,359 | B1 | 5/2002 | Chandra et al. |
| 6,414,958 | B1 | 7/2002 | Specht |
| 6,434,221 | B1 | 8/2002 | Chong |
| 6,473,798 | B1 | 10/2002 | Grosser, Jr. et al. |
| 6,477,238 | B1 | 11/2002 | Schneider |
| 6,510,463 | B1 | 1/2003 | Farhat et al. |
| 6,574,309 | B1 | 6/2003 | Chea, Jr. |
| 6,580,727 | B1 | 6/2003 | Yim et al. |
| 6,594,343 | B1 | 7/2003 | Duffie |
| 6,687,335 | B1 | 2/2004 | Jones |
| 7,068,758 | B1 | 6/2006 | Wallace et al. |
| 7,349,345 | B1 * | 3/2008 | Hansen et al. ............... 370/242 |
| 7,433,450 | B2 * | 10/2008 | Burns et al. ..................... 379/9 |
| 2003/0083842 | A1 | 5/2003 | Miller et al. |
| 2003/0188003 | A1 | 10/2003 | Sylvest et al. |
| 2003/0204611 | A1 | 10/2003 | McCosh et al. |
| 2003/0218984 | A1 * | 11/2003 | Tanaka ....................... 370/248 |
| 2004/0010627 | A1 | 1/2004 | Ellis et al. |
| 2005/0015644 | A1 | 1/2005 | Chu et al. |
| 2005/0025189 | A1 | 2/2005 | Smith |
| 2006/0227706 | A1 | 10/2006 | Burst |
| 2006/0242289 | A1 | 10/2006 | Miller et al. |
| 2007/0121792 | A1 * | 5/2007 | Chong ....................... 379/1.01 |

FOREIGN PATENT DOCUMENTS

| | | |
|---|---|---|
| CA | 2448909 A1 | 12/2002 |
| CA | 2 359 991 A1 | 3/2003 |
| JP | 2000332755 | 11/2000 |
| WO | WO 02/14977 A2 | 2/2002 |
| WO | WO 02/17571 A1 | 2/2002 |
| WO | WO 02/056541 A3 | 7/2002 |
| WO | WO 2004/066601 A1 | 8/2004 |
| WO | WO 2005/032047 A1 | 4/2005 |
| WO | WO 2005/0322047 | 4/2005 |
| WO | PCT/CA2005/001931 | 4/2006 |

OTHER PUBLICATIONS

Notice of Allowance, mail date Feb. 6, 2008, for U.S. Appl. No. 10/670,261.

Documentation from http://www.ando.co.jp—website for Ando Electric Co., Ltd.: (i) home p.; (ii) Products Info; (iii) Measuring Instruments; and (iv) xDSL loop Tester,LX100.

* cited by examiner

METHOD AND SYSTEM FOR CONNECTION VERIFICATION

PRIORITY CLAIM

The present application is a continuation of PCT Patent Application Number PCT/CA2004/001740, filed Sep. 24, 2004, which is a continuation-in-part of U.S. patent application Ser. No. 10/670,261, filed Sep. 26, 2003, now U.S. Pat. No. 7,433,450, the contents of both of which are incorporated herein by reference.

FIELD OF THE INVENTION

The present invention relates generally to computer networking and more particularly to a system and method for connection verification.

BACKGROUND OF THE INVENTION

Solving the "last-mile" problem has been an important piece of providing ubiquitous, high-speed Internet access to business and residential customers ("subscribers") at their premises. Digital Subscriber Line ("DSL") and CATV Internet services, are now well-entrenched means of solving the last-mile problem. Internet over satellite is now being offered by various telecommunication service providers, and land-based fixed wireless solutions such as those being promulgated by companies such as Soma Networks Inc. of San Francisco Calif., also offer the promise of effective last-mile solutions. See for example WO0189096A2 published Nov. 22, 2001.

A common feature of last mile solutions is a switching station that has a gateway connected to the Internet via a backhaul, such as a T1, T3, or a virtual network or the like. The gateway interfaces the backhaul with the particular communication medium or channel used to deliver the Internet service to the subscriber premises.

In DSL (and its variants, commonly referred to xDSL) the switching station is typically a central office as commonly found in the public switched telephone network ("PSTN"), and the gateway is a Digital Subscriber Line Access Module ("DSLAM"). The communication medium is typically the traditional twisted pair of copper wires that run between the central office and subscriber premises, and normally connect to a plain old telephone service ("POTS") telephone in the subscriber premises. Where the subscriber is a DSL customer, the twisted pair of copper wires in the customer premises are also connected to a DSL modem, which in turn connects to the subscriber's computer or intranet.

Problems with the foregoing arise when a subscriber loses, or believes they have lost, Internet connectivity. To troubleshoot this problem, it is common for the service provider to send a service technician to the subscriber premises. To verify Internet connectivity, the service technician can attempt to make their own Internet connection from the subscriber premises in order to assess whether a connectivity problem actually exists, and if so, to attempt to determine the nature of the problem. However, such use of service technicians can be wasteful, particularly where the technician discovers that no connectivity problem exists and that the subscriber's problems are in fact related to the subscriber's proprietary equipment, or other equipment located at the subscriber's premises. Where connectivity problems are found to exist, then the service provider is faced with the additional cost of dispatching a service technician to the central office housing the DSLAM to perform further troubleshooting. In fact, where connectivity problems are found to exist at the DSLAM, it is actually common to simply change the subscriber's port on the DSLAM, without troubleshooting the cause. This can lead to having DSLAMs with several unused ports, as the service provider may elect not to troubleshoot those DSLAMs due to costs and labour issues surrounding the administration of central offices.

It is therefore desirable to have ways to test network connections over twisted pair networks and the like that reduce the reliance on technicians to be dispatched to specifically identify and repair network connections problems. Still further problems with prior art testing of network connections include a lack of ability to remotely test at the application layer and/or certain other layers above the physical layer of a given connection.

SUMMARY OF THE INVENTION

It is an object of the present invention to provide a novel system and method for connection verification that obviates or mitigates at least one of the above-identified disadvantages of the prior art.

An aspect of the invention provides a method of verifying at least a portion of a connection between a subscriber station and a network wherein a gateway resides intermediate the subscriber station and the network, the method comprising:

introducing a tester into the connection;
remotely instructing the tester to perform at least one connectivity test between the gateway and the network; and
generating an output reporting a result of the at least one connectivity test.

The gateway can be a DSLAM, and the portion of the connection between the gateway and the subscriber station includes a copper twisted pair. The network can be the Internet and the portion of the connection between the gateway and network can a backhaul to the Internet, such as a T3, T1 etc.

The tester can be introduced via a remote instruction from a verification host computer.

The tester can be introduced into the connection at the gateway.

The gateway can be a DSLAM at a telephone central office and the tester can be introduced into the DSLAM using a manual connection.

The method can further comprise remotely instructing the tester to perform at least one additional connectivity test between the gateway and the subscriber station and wherein the report includes a result of the at least one additional connectivity test. The at least one additional connectivity test can be a metal test of a copper twisted pair that forms at least part of the connection between the gateway and the subscriber station. The remote instructions can originate from a verification host connected to the tester and the report will be outputted to the verification host. The at least one connectivity test can comprises "pinging" the tester from the host via the Internet. The report can include ping statistics delivered to the host.

The verification host can be connected to the tester via a virtual link through the Internet.

Where the subscriber station has a dynamic IP address, the method can further comprise, after the introducing a tester into the connection:

remotely providing the dynamic IP address to the tester via a DHCP server;
sending the dynamic IP address from the tester to the host via the Internet.

The verification host can be connected to the tester via a link independent of the network.

Where the subscriber station has a static IP address, the method can further comprise the step of remotely providing the static IP address to the tester via the link.

Another aspect of the invention provides a system for verifying at least a portion of a connection between a subscriber station and a network wherein a gateway resides intermediate the subscriber station and the network, the system comprising:
  means for introducing a tester into the connection;
  means for remotely instructing the tester to perform at least one connectivity test between the gateway and the network; and
  means for generating an output reporting a result of the at least one connectivity test.

Another aspect of the invention provides a system for verifying at least a portion of a pathway between a subscriber station and a network comprising of a gateway intermediate the subscriber station and the network. The gateway is operable to translate communications between the subscriber station and the network. The system also comprises a tester for connection into the pathway. The tester is operable to receive remote instructions to perform at least one connectivity test over at least a portion of the pathway. The system also includes a host connected to the tester for remotely instructing the tester to perform the at least one connectivity test and to receive reports thereof from the tester.

Another aspect of the invention provides a method of remotely verifying a connection between a subscriber station and a network wherein a gateway resides intermediate the subscriber station and the network, the method comprising:
  remotely triggering the introduction of a tester into the connection, the tester operable to perform link and connectivity tests;
  performing a test of a link between the gateway and the subscriber station;
  performing a connectivity test between the gateway and the network; and
  reporting the status of the connection to a remote location.

Another aspect of the invention provides a system for remotely verifying a connection between a subscriber station and a network wherein a gateway resides intermediate the subscriber station and the network, the system comprising: a remote control terminal and a tester coupled remotely to the remote control terminal and operable to be introduced into the connection and controlled by the remote control terminal. The tester is operable to receive a connection test message from the remote control terminal and in response, conduct at least one of: a test of a link between the gateway and the subscriber station and a test between the gateway and the network. The tester is further operable to report results of the tests. The system also comprises a remote reporting terminal coupled remotely to the tester and operable to receive and process the results of the tests.

Another aspect of the invention provides a apparatus for controlling verification of a connection between a subscriber station and a network from a remote location, wherein a gateway resides intermediate the subscriber station and the network, the apparatus comprising:
  an interface operable to be coupled to a tester;
  a processing unit operable to instruct the tester to be introduced into the connection and, the processing unit further operable to instruct the tester to conduct a connectivity test between the gateway and the network and report of the status the connection; the processing unit further operable to receive and output the report of the status of the connection.

Another aspect of the invention provides a test apparatus for remotely verifying a connection between a subscriber station and a network wherein a gateway resides intermediate the subscriber station and the network, the test apparatus comprising: first interface operable to be coupled to a remote control terminal and a second interface operable to introduce the tester to the connection. The apparatus also includes a processing unit operable to receive connection test messages from the remote control terminal and, upon reception of a connection test message, the apparatus is further operable to conduct a connectivity test between the gateway and the network, and to transmit a report of the status of the connection to a remote location.

Another aspect of the invention provides a method of remotely verifying layer 3 connectivity for a subscriber station wherein a gateway resides intermediate in a connection between the subscriber station and a layer 3 network, the method comprising:
  remotely triggering a tester to be introduced into the connection;
  performing a layer 3 connectivity test between the gateway and the network; and
  reporting the status of the layer 3 connectivity to a remote location.

Another aspect of the invention provides a system for remotely verifying layer 3 connectivity for a subscriber station wherein a gateway resides intermediate in a connection between the subscriber station and a layer 3 network The system comprises a remote control terminal and a tester coupled remotely to the remote control terminal. The tester is operable to be introduced into the connection and controlled by the remote control terminal. The tester is operable to receive a connectivity test message from the remote control terminal and in response, conduct a layer 3 connectivity test between the gateway and the network, and report the results of the connectivity test. The system also comprises a remote reporting terminal coupled remotely to the tester and operable to receive and process the results of the connectivity test.

Another aspect provides a method of verifying a connection between a subscriber station and a network wherein a gateway operated by a service provider resides intermediate the subscriber station and the network, the method comprising:
  determining that a problem exists with the connection;
  introducing a tester controllable by the service provider into the connection;
  instructing the tester to perform a test of a link between the gateway and the subscriber station;
  repairing the link if the link test fails and terminating the method if the problem is resolved;
  if the problem remains unresolved, instructing the tester to perform a connectivity test between the gateway and the network;
  repairing the gateway if the connectivity test fails;

Another aspect of the invention provides tester introducible to a connection spanning a subscriber station, a gateway and a network. The tester comprises a interface for introducing the tester to the connection, and a processing unit that is operable to receive remote instructions to perform at least one connectivity test over at least a portion of the connection. The processing unit in the tester is further operable to output results of the at least one connectivity test over the interface.

Another aspect of the invention provides a verification host for conducting a remote test of a connection spanning a subscriber station, a gateway and a network via a tester introduced into the connection. The tester is operable to receive remote instructions from the host and is also operable to perform at least one connectivity test over at least a portion of the connection network. The host comprises an interface for remotely connecting to the tester via a link, and an input device for receiving input from a user representing instructions to the tester to perform the at least one connectivity test. The host also comprises a processing unit for receiving the input and relaying the instructions to the tester via the interface and the link. The processing unit is also for receiving results of the connectivity test from the tester via the interface. The host also comprises an output device for presenting the results to the user.

Another aspect of the invention provides a method of verifying at least a portion of a connection between a subscriber station and a network wherein a gateway resides intermediate the subscriber station and the network, the method comprising:
 introducing a tester into the connection;
 remotely instructing the tester to perform at least one connectivity test between the gateway and the subscriber station; and
 generating an output reporting a result of the at least one connectivity test.

Another aspect of the invention provides a system for verifying a connection between a subscriber station and a network wherein a gateway resides intermediate the subscriber station and the network, the system comprising
 means for introducing a tester into the connection;
 means for remotely instructing the tester to perform at least one connectivity test between the gateway and the subscriber station; and
 means for generating an output reporting a result of the at least one connectivity test.

Another aspect of the invention provides a method of remotely verifying a connection between a subscriber station and a network wherein a gateway resides intermediate the subscriber station and the network, the method comprising:
 remotely triggering the introduction of a tester into the connection, the tester operable to perform link and connectivity tests;
 performing a first connectivity test between the gateway and the subscriber station;
 performing a second connectivity test between the gateway and the network; and
 reporting the status of the connection to a remote location.

Another aspect of the invention provides an apparatus for controlling verification of at least a portion of a connection between a subscriber station and a network from a remote location, wherein a gateway resides intermediate the subscriber station and the network, the apparatus comprising:
 an interface operable to be coupled to a tester;
 a processing unit operable to instruct the tester to be introduced into the connection, the processing unit further operable to instruct the tester to conduct a connectivity test between the gateway and the subscriber station and report of the status of the connection; the processing unit further operable to receive and output the report of the status of the connection.

Another aspect of the invention provides a test apparatus for remotely verifying at least a portion of a connection between a subscriber station and a network wherein a gateway resides intermediate the subscriber station and the network, the test apparatus comprising: a first interface operable to be coupled to a remote control terminal and a second interface operable to introduce the tester to the connection. The apparatus also includes a processing unit operable to receive connection test messages from the remote control terminal and, upon reception of a connection test message, the apparatus is further operable to conduct a connectivity test between the gateway and the subscriber station, and to transmit a report of the status of the connection to a remote location.

BRIEF DESCRIPTION OF THE DRAWINGS

The invention will now be described by way of example only, and with reference to the accompanying drawings, in which.

DETAILED DESCRIPTION OF THE INVENTION

Figure 1:
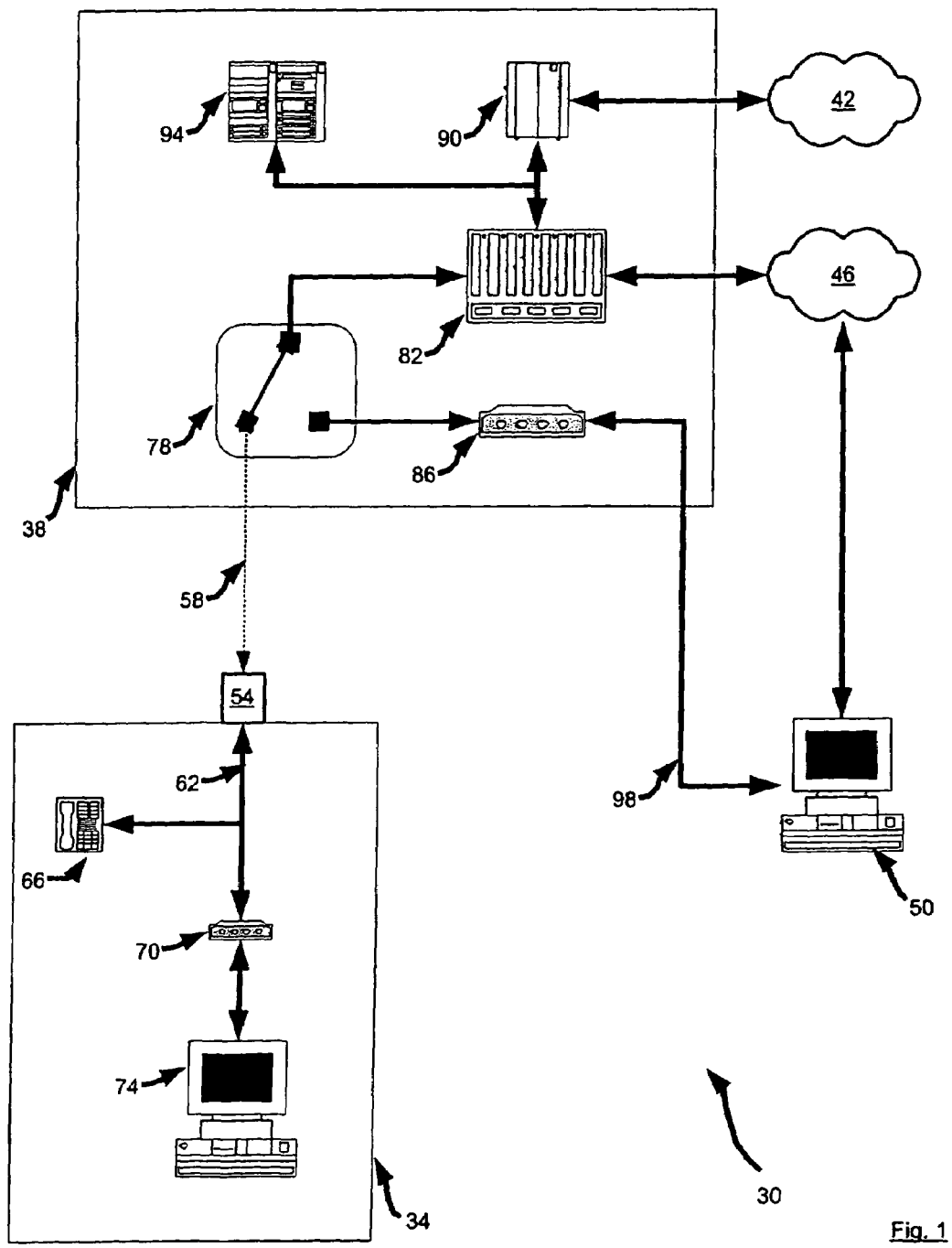
FIG. 1 is a schematic representation of a system for connection verification in accordance with an embodiment of the invention.

Referring now to FIG. 1, a system for connection verification is indicated generally at 30. System 30 comprises at least one subscriber premises 34 that is connected to a central office 38. In turn, central office 38 is connected to both the PSTN 42 and the Internet 46. Internet 46 is also connected to an access verification host 50.

Subscriber premises 34 is characterized by a subscriber junction 54 that connects to a POTS copper wire twisted pair 58 that runs between subscriber premises 34 and central office 38. It should be understood that twisted pair 58 represents all of the components that typically lie along the path of pair 58, including junction boxes, bridges etc. Junction 54 also connects to subscriber wiring 62, which reflects the internal telephone wiring of premises 34. Thus, subscriber premises 34 is also characterized by a POTS telephone 66, a DSL modem 70, and an Internet client 74, all of which connect to junction 54 over subscriber wiring 62. Internet client 74 is any computing device, such a personal computer, server, personal digital assistant or the like that is operable to conducting communications over Internet 46. It is to be clarified that the particular equipment configuration of subscriber premises 34 is merely exemplary, and other configurations of subscriber premises can include any number of other communication appliances and arrangements thereof, such as additional POTS telephones, a private branch exchange ("PBX"), a wireless access point ("WAP"), firewalls, gateway routers, print servers, file servers, email servers, intranets, or the like. Additionally, it is to be clarified that subscriber premises 34 can belong to residential, business or any other type of subscriber.

Figure 2:
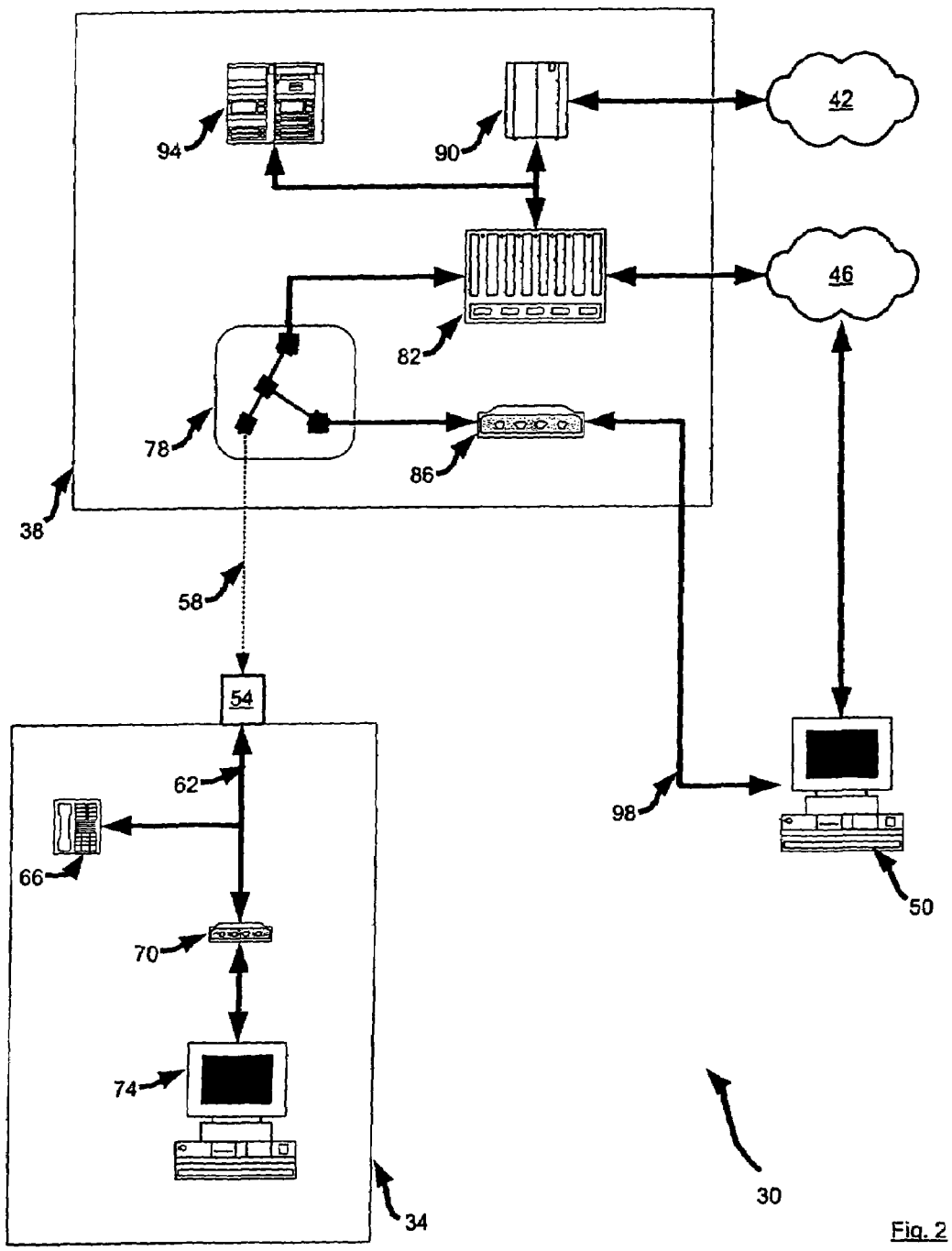
FIG. 2 shows the system of FIG. 1 with the junction switch in a second position.
Figure 3:
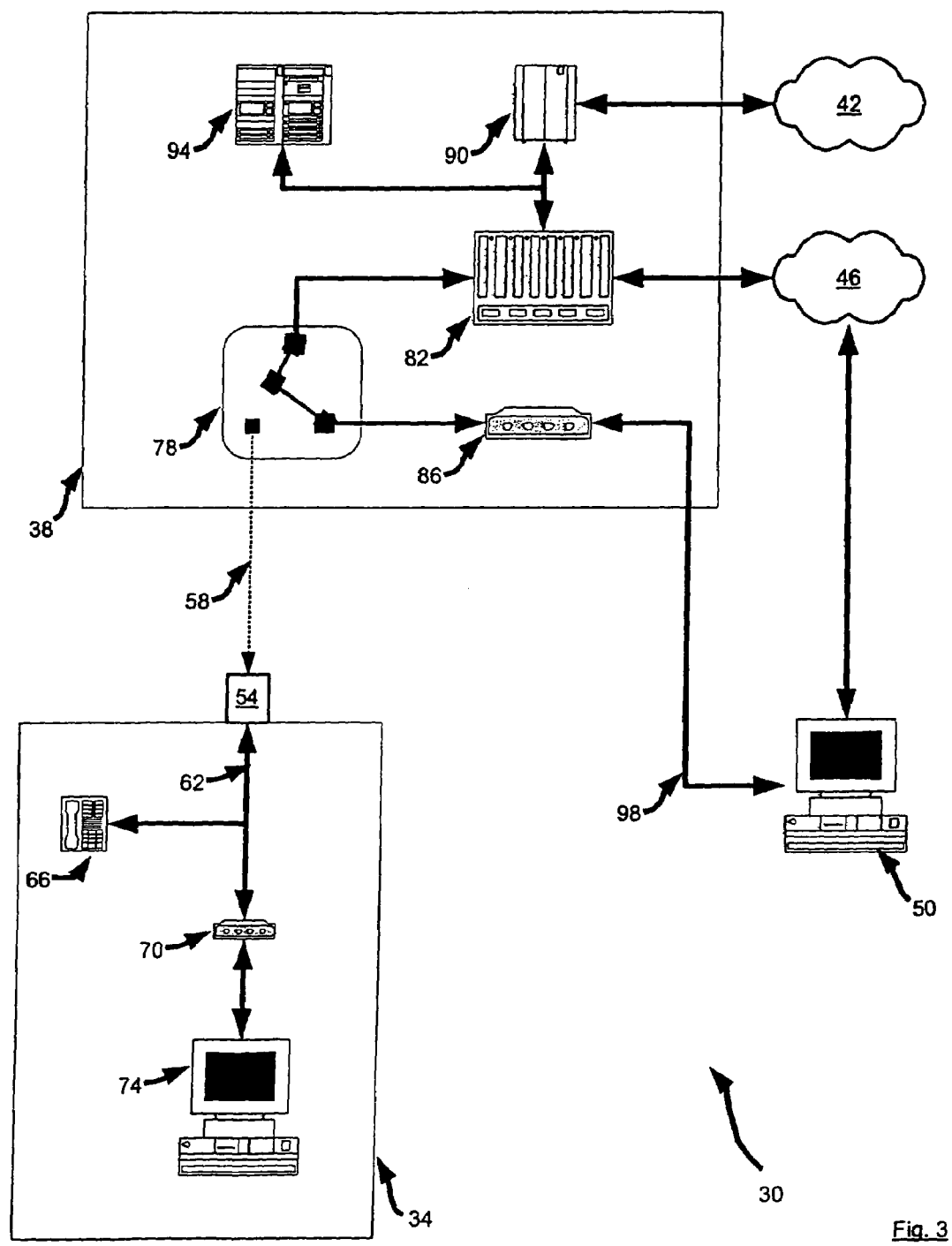
FIG. 3 shows the system of FIG. 1 with the junction switch in a third position.

Central office 38 is characterized by a central office junction 78 that connects the end of twisted pair 58 opposite to subscriber premises 34. Junction 78 has at least two positions. In a first position, shown in FIG. 1, central office junction 78 connects twisted pair 58 to a DSLAM 82. In a second position, shown in FIG. 2, unction 78 connects twisted pair 58 to DSLAM 82 and a tester 86. In a third position, shown in FIG. 3, junction 78 connects DSLAM 82 to tester 86. In a present embodiment, changes to junction 78 are effected manually by use of a "shoe" as such a device is commonly referred to by various telecommunication industry workers. In particular, a technician assigned to central office 38 will be instructed to effect a change in junction 78 from the first position in FIG. 1 the second position in FIG. 2, by means of connecting a "shoe" to the port on DSLAM 82 to which twisted pair 58 is connected. It is to be understood, however, that in other embodiments that junction 78 can be effected through other means, simply by running a jumper from DSLAM 82 to tester 86. Changes to the position of junction 78 can also be automated, such as through a digital cross connection or other electronic switching circuitry that is operable from host 50, such that an operator of host 50 can selectively, and remotely, cause junction 78 to move between the various positions shown in FIGS. 1, 2 and 3. DSLAM 82 is any known DSLAM such as the Alcatel Standard Density DSLAM, Model 1000 ADSL from Alcatel USA, Inc., 3400 W. Piano Parkway, Plano, Tex. 75075, or the Alcatel High HI Density DSLAM, Model 7300 ASAM also available from Alcatel USA, Inc. DSLAM 82 is generally operable to act as a gateway between Internet 46 and twisted pair 58 and thereby allow client 74 to communicate over Internet 46.

Tester 86 includes functionality inherent Alcatel Speed Touch 1000 Golden Modem, available from Alcatel USA, Inc., 3400 W. Plano Parkway, Plano, Tex. 75075 in that tester 86 is operable, when junction 78 is in the second position shown in FIG. 2, and in conjunction with a toll grade test head, (not shown), such as the Tollgrade Digitest Access Unit, Model DAU 1000, available from Tollgrade. to run a series of "metal tests" over twisted pair 58. As is understood by those of skill in the art, such "metal tests" ascertain whether twisted pair 58 possesses physical, electrical, and mechanical integrity for carrying DSL signals between DSLAM 82 and junction 54. In other words, such metal tests determine whether any physical damage or degradation has occurred over twisted pair 58, and such tests can ascertain whether twisted pair 58 is even physically capable of carrying the internet protocol ("IP") signals generated by DSLAM 82 and modem 70. As will be explained in greater detail below, tester 86 is also operable to interact directly with DSLAM 82 and to thereby conduct its own communications, and communication tests, over Internet 46.

Central office 38 also includes a PSTN switch 90 that is connected to subscriber premises 34 through DSLAM 82. PSTN switch 90 is also connected to PSTN 42, and is generally operable to switch telephone conversations between PSTN switch 90 and telephone 66.

In a present embodiment, central office 38 also includes a Dynamic Host Configuration Protocol ("DHCP") server 94 that is operable to dynamically assign an IP address to modem 70 at such time that modem 70 successfully communicates with DSLAM 82. It will now be understood that, in the present embodiment, system 30 is based on dynamic IP addresses, but it is to be understood that in other embodiments, DHCP server 94 can be eliminated where the system is based on static IP addresses, or the system can be a hybrid system where some subscribers have dynamic IP addresses, while others have static IP addresses. In a present embodiment, the functionality of DHCP server 94 is provided via a Redback SMS-100, from Redback Networks Inc., 300 Holger Way, San Jose, Calif. 95134-1362. As will be explained in greater detail below, when tester 86 is connected to DSLAM 82, tester 86 is operable to request an IP address from server 94.

Access verification host 50, in a present embodiment, is simply an Internet enabled computing device that is operable to communicate directly with tester 86 over a communication link 98. In a present embodiment, link 98 is a separate communication link from Internet 46, however, it is to be understood that in other embodiments link 98 can be effected via a direct connection between tester 86 and Internet 46, or, particularly where system 30 is based on dynamic IP addresses, a physical version of link 98 can be eliminated altogether. Thus, whether or not link 98 exists by way of a dedicated physical link between host 50 and tester 86, or by way of a virtual connection via Internet 46, it is to be understood that, in general, link 98 provides a means for host 50 to directly monitor, access, and otherwise control the operation of tester 86 from a remote location. By the same token, tester 86 includes firmware that permits verification host 50 to assume control over the operation of tester 86 and issue instructions thereto, and receive responses therefrom. For security purposes, in a present embodiment security features are enabled on tester 86 to reduce the likelihood of unauthorized access to central office 38 via internet 46, but still allow an operator of host 50 to perform an adequate or otherwise desired level of testing of the connectivity to Internet 46 via DSLAM 82. In a present embodiment, such security features are effected, at least in part, by only enabling Telnet and Hypertext Transfer Protocol ("http") ports on tester 86. Further security can be provided by only permitting certain IP addresses, such as the IP address belonging to host 50, to access tester 86. Details about the interaction between access verification host 50 and tester 86 will be explained in greater detail below.

Figure 4:
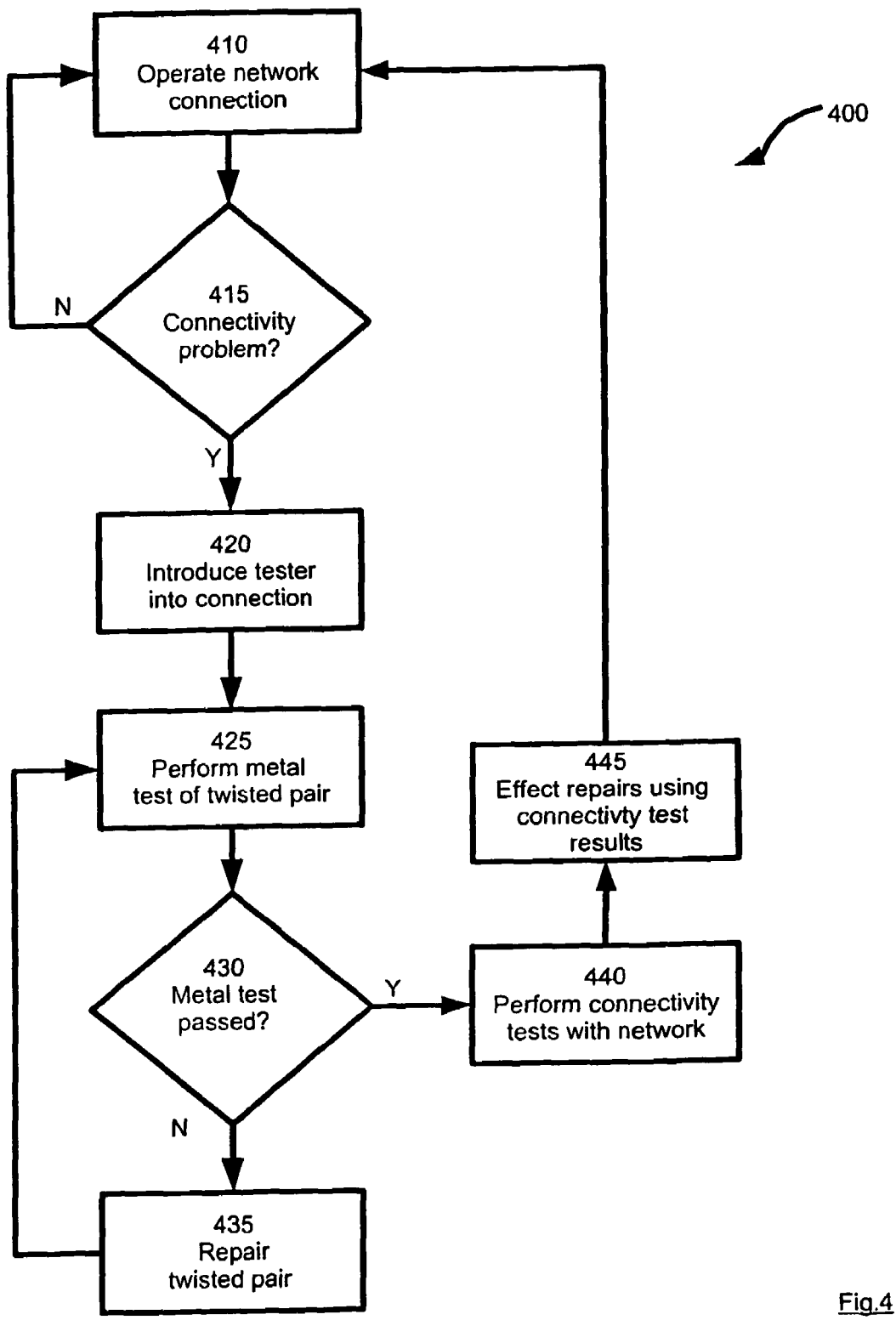
FIG. 4 is a flowchart depicting a method of connection verification in accordance with another embodiment of the invention.

Referring now to FIG. 4, a method for connection verification is indicated generally at 400. In order to assist in the explanation of the method, it will be assumed that method 400 is operated using system 30. Furthermore, the following discussion of method 400 will lead to further understanding of system 30 and its various components. (However, it is to be understood that system 30 and/or method 400 can be varied, and need not work exactly as discussed herein in conjunction with each other, and that such variations are within the scope of the present invention.)

Before discussing method 400, it will be assumed that junction 78 is in the first position shown in FIG. 1, wherein a direct connection exists between modem 70 and DSLAM 82. Beginning at step 410, the network connection is operated in the normal fashion. In system 30, such operation can involve the initialization of communications between modem 70 over Internet 46, or ongoing carrying of communications over Internet 46. Other means of normally operating the Internet connection between client 74 and Internet 46 will occur to those of skill in the art.

At step 415, a determination is made as to whether there is a connectivity problem with the connection that is being operated at step 410. If no such problem exists, the method simply loops back to step 410. However, such a connectivity problem can arise for any variety of reasons. The awareness of such a problem can arise in a variety of ways, but typically arises when a subscriber operating client 74 is unable to maintain or otherwise conduct communications with Internet 70, or when a subscriber operating client 74 experiences communication speeds over Internet 70 that are lower than should be expected. In this situation, the subscriber operating client 74 that believes such connectivity problems are the fault of the service provider operating central office 38, then the subscriber will typically contact the service provider and request that the problem be corrected. Regardless of how a connectivity problem is identified, if it is determined at step 410 that a connectivity problem exists, the method will advance to step 420.

At step 420, a tester is introduced into the network connection with the problem. In system 30, this is effected by placing junction 78 into the second position shown in FIG. 2. This can be performed manually, as can be commonly found in a traditional telephone company structure that operates a central office like central office 38, by having a service technician introduce a "shoe" that shunts tester 86 into the connection between DSLAM 82 and twisted pair 58. In other embodiments, where junction 78 is automated and can be operated remotely, a user at host 50 (who is typically an employee or other representative of the service provider) will remotely access junction 78 via host 50 and issue an instruction to host 50 that is delivered to junction 78 to instruct junction 78 to move from the first position in FIG. 1 to the second position in FIG. 2.

Figure 5:
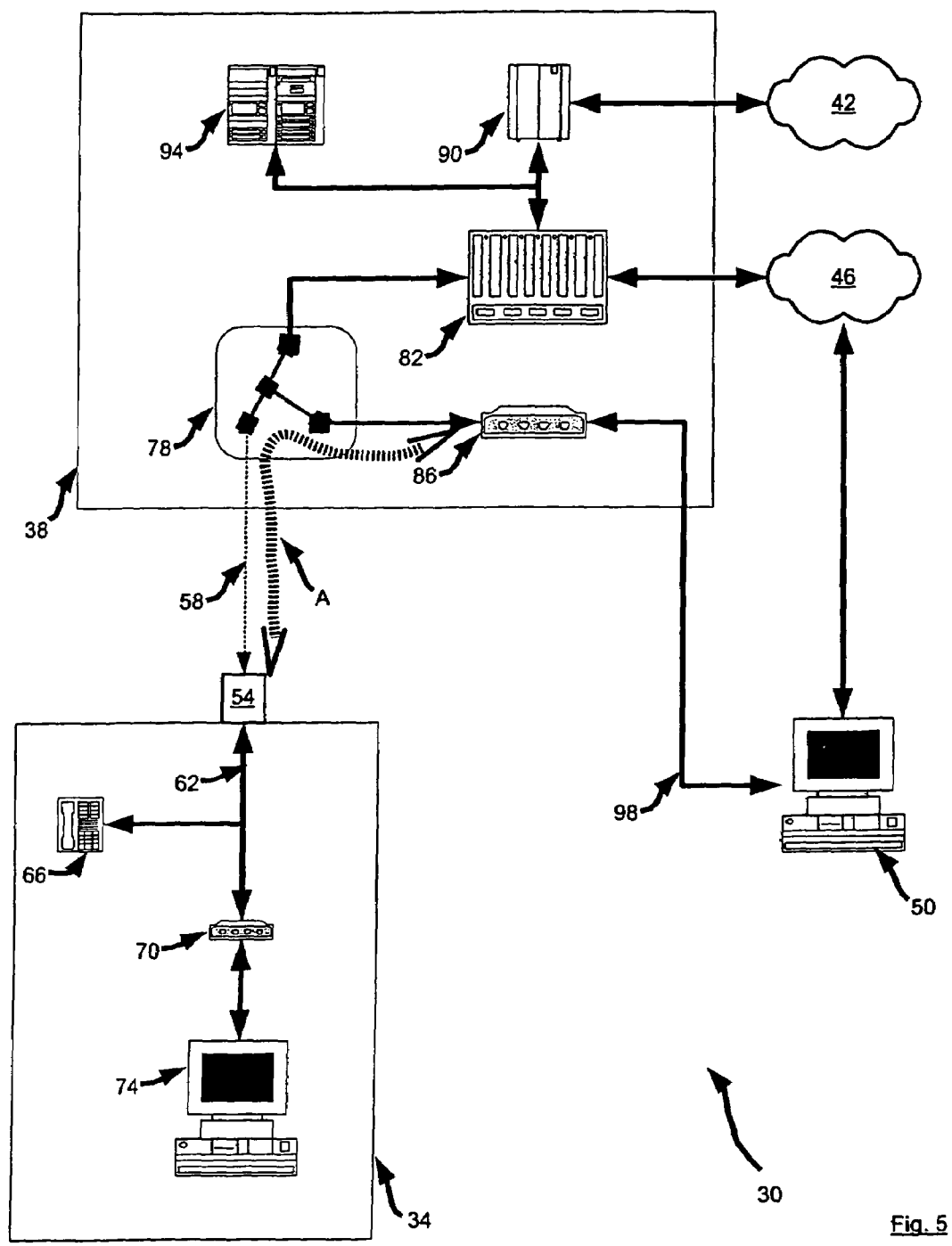
FIG. 5 shows the system in FIG. 2 during the performance of the method in FIG. 4.

Next, at step 425, a metal test is performed on the twisted pair. When implemented on system 30, the user at host 50 will issue an instruction to tester 86 (and/or to any "test heads" associated therewith), to perform a standard set of physical tests of twisted pair 58. This is represented in FIG. 5 by the dotted line indicated at reference character "A". Dotted line A shows the pathway of the various electrical pulses that are delivered down twisted pair 58 by tester 86 to ascertain the physical integrity of twisted pair 58.

Next, at step 430, a determination is made as to whether the metal test performed at step 425 "passed". If the metal test did not pass, (i.e, it "failed" in that negative results were obtained which indicated a failure or degradation of twisted pair 58 such that twisted pair 58 was shown to be unable to physically carry an Internet connection between DSLAM 82 and modem 70) then the method will advance to step 435, at which point standard repair procedures of twisted pair 58 will be effected. Once the repairs are effected at step 435, in a present embodiment, method 400 returns to step 425 and the metal test is performed again.

If, at step 430, it is determined that the metal test passed, the method advances to step 440. At step 440, connectivity tests with the network are performed. These tests can typically be performed with junction 78 in the second position shown in FIG. 2, however, where interference or noise is occurring over twisted pair 58 (i.e. from modem 70), then it can be desired to effect step 440 with junction 78 in the third position in FIG. 3, wherein twisted pair 58 is disconnected from DSLAM 82. However, in the present example, it will be assumed that step 430 is performed with junction 78 in the second position. It will be further assumed that system 30 operates based on DHCP. Thus, when step 440 is performed, once tester 86 is connected to DSLAM 82, tester 86 will attempt to initiate an Internet connection with DSLAM 82 in substantially the same manner as modem 70 would have attempted with DSLAM 82 if system 30 was operating normally with junction 78 in the first position shown in FIG. 1. Thusly, tester 86 will attempt to obtain an IP address, and, if DSLAM 82 (and/or the port on DSLAM 82 through which tester 86 is connected) is operating properly, then DHCP server 94 will assign an IP address to tester 86.

If, for example, tester 86 is unsuccessful at even obtaining an IP address, however, then a failure will be detected within central office 38 and the method will advance to step 445 where repairs can be effected. Such failure to even obtain an IP address by tester 86 can be reported back to host 50 via link 98 (where link 98 is operable without the need such an IP address), and the user at host 50 can dispatch repair personnel to central office 38 to investigate and/or effect repairs. Once repairs are effected, method 400 returns to step 410 where normal network operation can resume.

Figure 6:
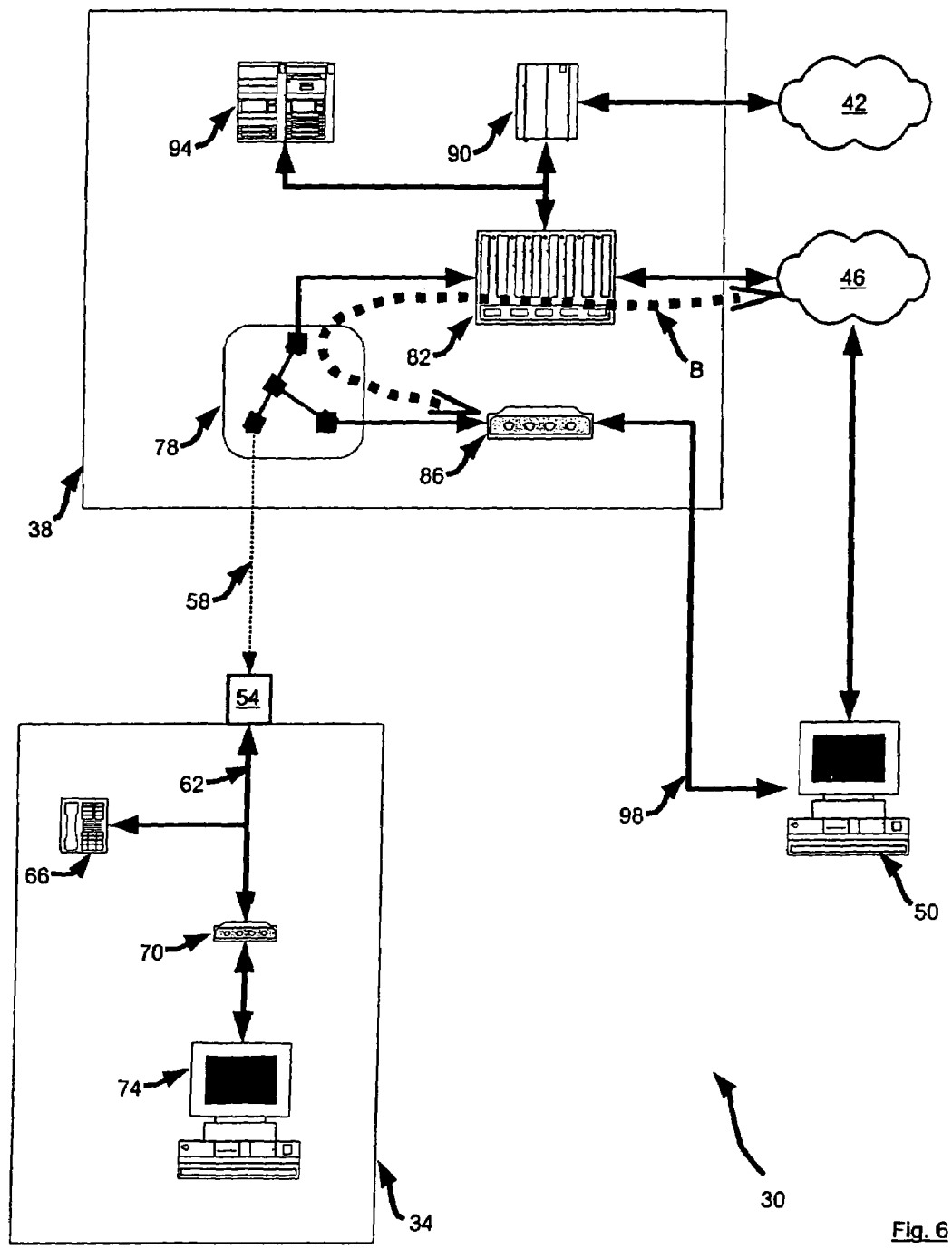
FIG. 6 shows the system in FIG. 2 during the performance of the method in FIG. 4; and, FIG. 7 is a schematic representation of a system for connection verification in accordance with another embodiment of the invention.

Other factors can contribute to a failure of the performance of tests at step 440. For example, assuming that tester 86 succeeds in obtaining an IP address from DHCP server 94, it is contemplated then that tester 86 will report this success, and this IP address, back to host 50, either via internet 46, or via link 92. Once host 50 has determined that an IP address has been assigned to tester 86, host 50 can then perform a variety of tests to ascertain the quality of the connection. Such a connection is represented in FIG. 6 by the dotted line indicated at reference character "B". With a connection established according to dotted line "B", host 50 can then send a plurality of test messages, such as by "pinging" tester 86 via Internet 46. Ping statistics (i.e. packet loss, round trip times, etc.) returned to host 50 can then be used by the user at host 50 to determine the quality of the connection represented by dotted line "B".

If such ping statistics are abnormal, then the user at host 50 can then determine that the connectivity problems lie somewhere along the path represented by dotted line "B" (or even farther along Internet 46), and, at step 445, can implement such steps as are needed to resolve such connectivity problems.

If such ping statistics appear normal, the user at host 50 can then determine that the connectivity problem perceived at step 415 does not lie anywhere in the path between junction 54 and Internet 46, and can accordingly relate to the subscriber at premises 34 that the source of the connectivity problem perceived at step 415 most likely resides within premises 34. In this situation, the repairs effected at step 445 are then carried out under the responsibility of the subscriber at premises 34, either by engaging the services of the service provider that owns central office 38, or such other means at the disposal of the subscriber. Once such repairs are effected, the method returns to step 410.

Figure 7:
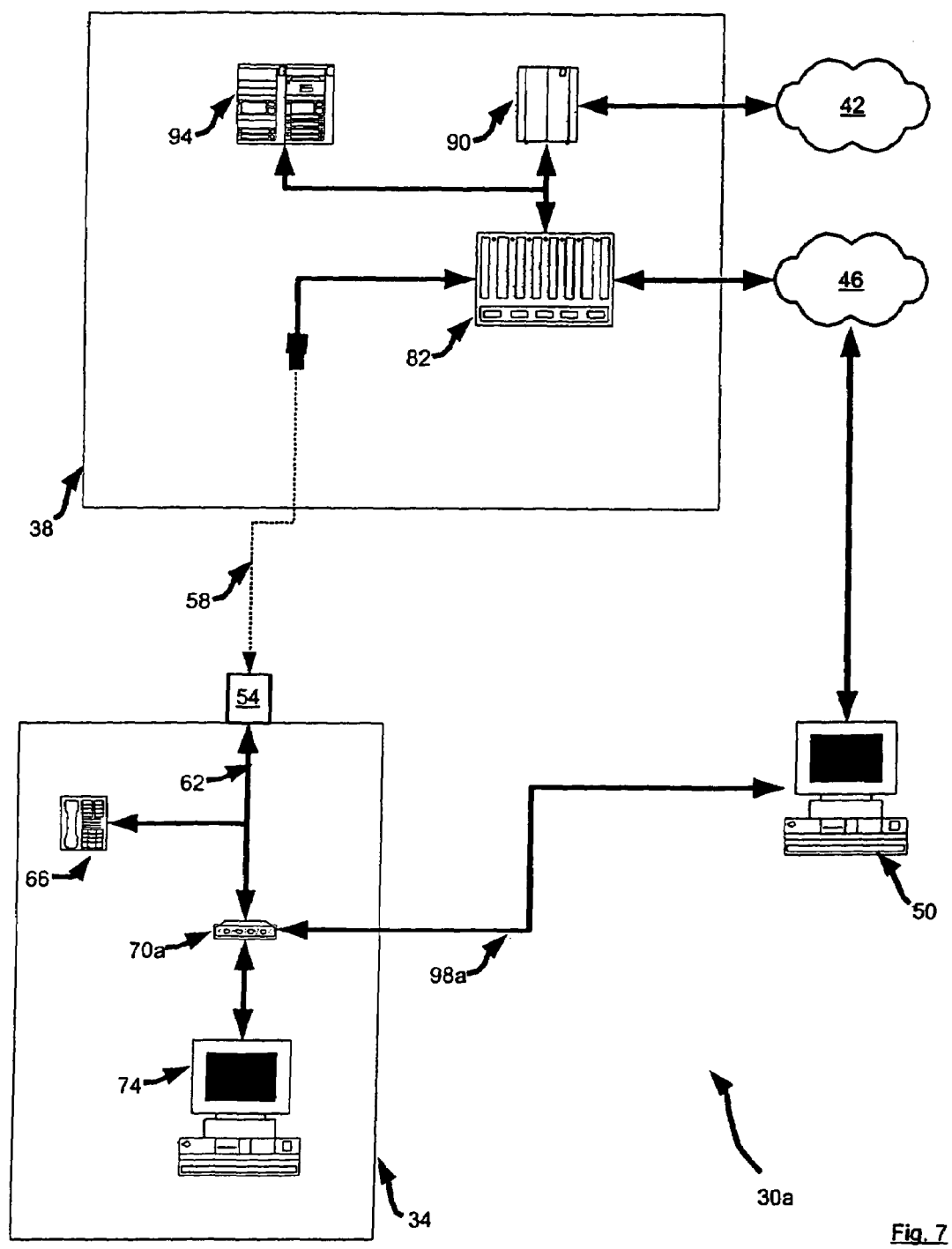

Referring now to FIG. 7, a system for connection verification is indicated at 30a in accordance with another embodiment of the invention. System 30a is substantially the same as system 30, and like items bear like references. In contrast to system 30a, however, system 30a includes a smart modem 70a that is resident at subscriber premises 34. Smart modem 70*a* includes the features of modem 70 in system 30, but also includes the features of tester 86 in system 30. Thus, modem 70 is operable to perform "metal tests" along twisted pair 58, but originating those tests from subscriber premises 34. Smart modem 70*a* is also connected to host 50 via a link 98*a*, so that host 50 can issue instructions to and otherwise control smart modem 70*a* from the remote location where host 50 is located.

Link 98*a* can be effected in a variety of ways, such as a traditional PSTN dial-up modem connection. Alternatively, where smart modem 70*a* is DHCP enabled, then link 98*a* can be a virtual link that physically exists along twisted pair 58. In this example, if host 50 is unable to even communicate with smart modem 70*a*, and assuming that the subscriber at premises 34 can verify a physical connection of smart modem 70*a* to junction 54, then a connectivity problem between junction 54 and Internet 46 can be assumed by a user at host 50. However, if modem 70*a* is able to report its IP address back to host 50, then host 50 can use link 98*a* to instruct smart modem 70*a* to perform connectivity tests between modem 70*a* and internet 46, of the nature previously described with regard to method 400.

While only specific combinations of the various features and components of the present invention have been discussed herein, it will be apparent to those of skill in the art that desired subsets of the disclosed features and components and/or alternative combinations of these features and components can be utilized, as desired. For example, while system 30 in FIG. 1 includes a variety of POTS equipment, including telephone 6, switch 90 and PSTN 42, it is to be understood that these elements can all be omitted in other embodiments of the invention.

Further, where modem 70 of system 30 has a static IP address, and does not rely on DHCP server 94, then as another variation on method 400, host 50 will inform tester 86 of an IP address that can be used when connectivity tests are performed at step 440.

Furthermore, it should be understood that, while method 400 contemplates the existence of a connectivity problem at step 415, it should be understood that the teachings herein can be applied to verify connections on a proactive basis, or other circumstances where no actual connectivity problem has been detected or even exists. By the same token, it should be understood that the effecting of repairs at steps 435 and 445 can be omitted where no problem actually exists and/or is otherwise handled differently. Similarly, it can be desired to omit the performance of the metal test at step 425 altogether, if desired or appropriate. For example, it can be desired to omit the metal test at step 425 when it is desired to run a complete set of tests on all ports of DSLAM 82. Other variations on method 400 will now occur to those of skill in the art.

Figure 8:
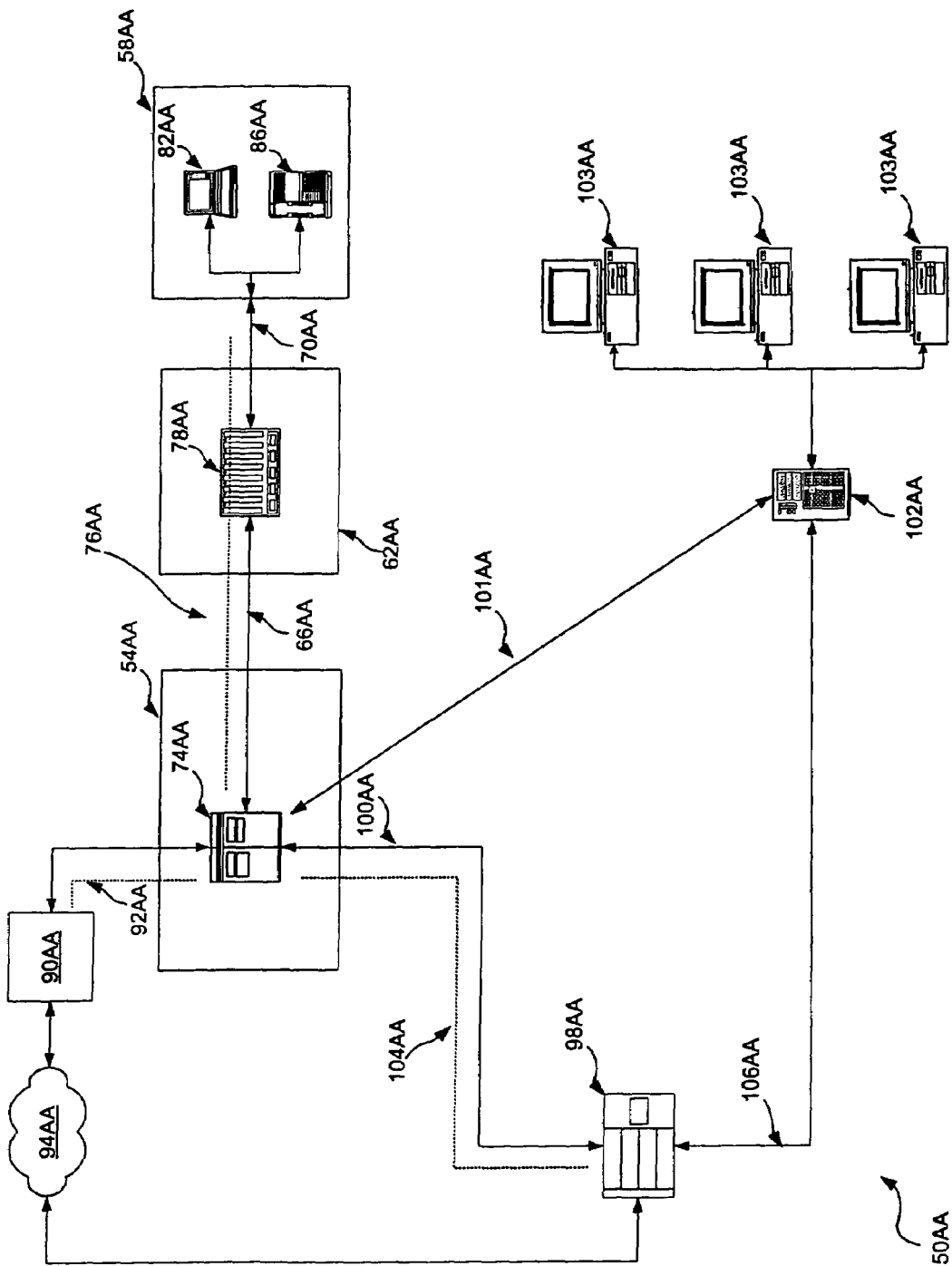
FIG. 8 is a schematic representation of a system for testing network connections in accordance with an embodiment of the invention.

Referring now to FIG. 8, a system for testing network connections is indicated generally at 50AA. In a present embodiment, system 50AA is based on the plain old telephone system ("POTS") having digital subscriber line ("DSL") capabilities. System 50AA thus comprises a central office 54AA that connects to a plurality of subscriber sites 58AA via a plurality of outside plant interfaces 62AA ("OPI"). More specifically, central office 54AA connects to OPI 62AA via a fibre-to-the-node ("FTTN") link 66AA, while OPI 62AA connects to each subscriber site 58AA via a copper twisted pair link 70AA.

For simplicity sake, FIG. 8 only shows one OPI 62AA connected to a single subscriber site 58AA, but those of skill in the art will appreciate that a single central office 54AA can typically serve several OPIs 62AA, and in turn each OPI 62AA will serve several subscriber sites 58AA. Furthermore, while system 50AA is based on the POTS system, FIG. 8 does not illustrate legacy public switched telephone network ("PSTN") components but focuses on the DSL features found in system 50AA, and it is to be emphasized that while such legacy PSTN components can be included in system 50AA, they are not necessary.

Central office 54AA includes a data network gateway 74AA, which in a present embodiment is a Stinger® FS+DSL Access Concentrator ("Stinger®") from Lucent Technologies, 600 Mountain Ave., Murray Hill, N.J. 07974-0636 USA, but other gateways can be used. OPI 62AA includes a digital subscriber line access module ("DSLAM") 78AA, and in a present embodiment the DSLAM is a Stinger® Compact Remote from Lucent Technologies, 600 Mountain Ave, Murray Hill, N.J. 07974-0636, but other DSLAMs can be used. Together, gateway 74AA and DSLAM 78AA cooperate to provide data services to subscriber site 58AA. Thus, each subscriber site 58AA in turn includes a plurality of subscriber devices that make use of the services made available by gateway 74AA and DSLAM 78AA. In a present embodiment, these devices include a computing device 82AA and a voice over internet protocol ("VOIP") telephony device 86AA. While not included in system 50AA, it is to be understood that other subscriber devices can also be provided depending on the types of data services being offered to subscribers, such as video. It is also to be understood that, while the present embodiment uses both a Stinger and a DSLAM, it should be understood that these are effectively a DSLAM implemented at two levels and other implementations, involving only a single DSLAM, are within the scope of the invention.

In a present embodiment, gateway 74AA is connected to an internet service provider ("ISP") 90AA, which in turn connects gateway 74AA to a data network, which in a present embodiment is the Internet 94AA.

As will be understood by those of skill in the art, when gateway 74AA is implemented using a Stinger®, then gateway 74AA can include a plurality of permanent virtual circuits ("PVC") that run over the physical connections between gateway 74AA and the other components in system 50AA. Such PVCs render gateway 74AA operable to allow a subscriber site to connect to a plurality of different data service providers (i.e. other than ISP 90AA), thereby allowing a subscriber to choose the service provider from which they obtain their data services. In a present embodiment, ISP 90AA is the same entity that owns and/or operates central office 54AA and OPI 62AA, however, in other embodiments these elements can be owned and/or operated by different entities.

Figure 9:
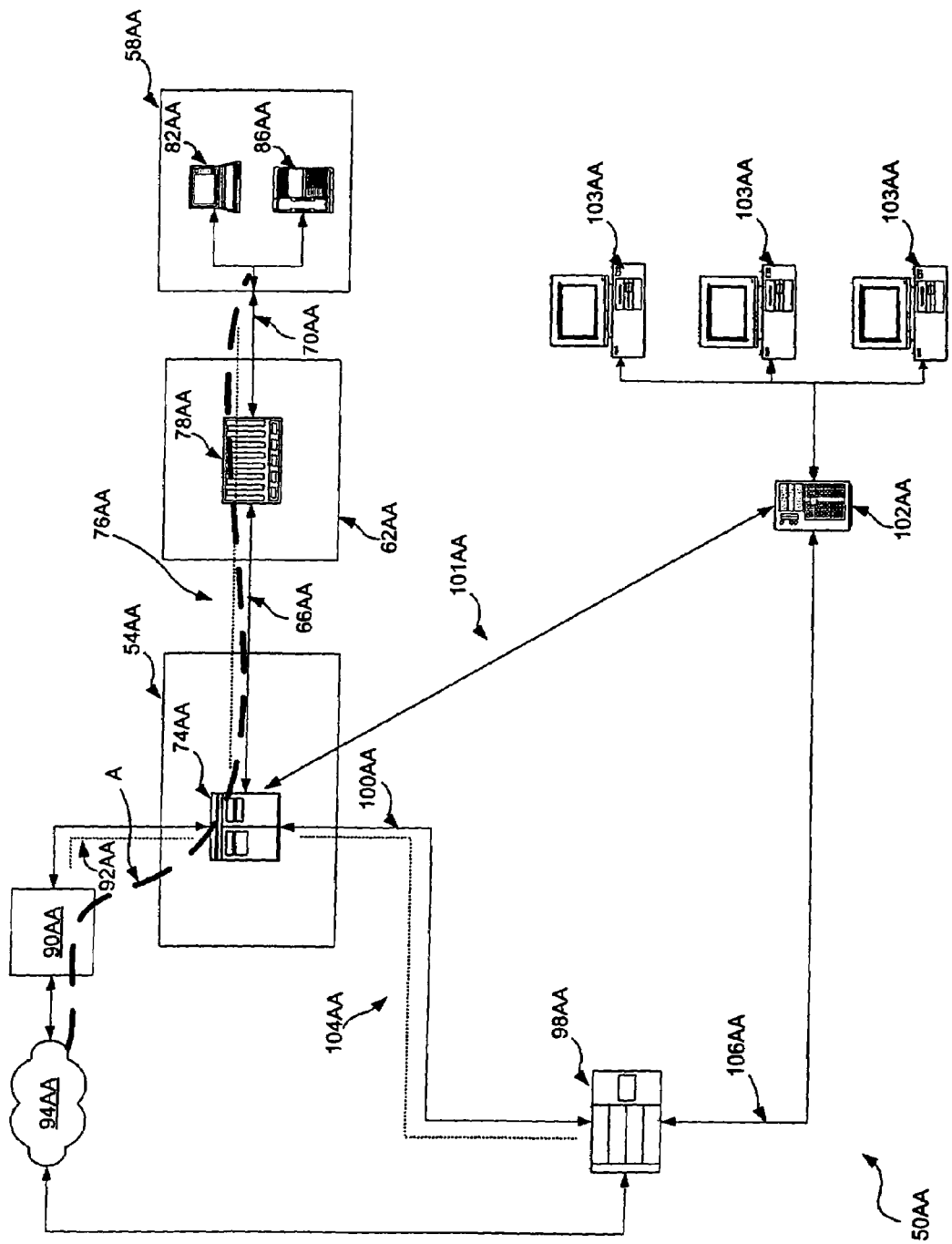
FIG. 9 shows the system of FIG. 8 operating in standard mode.

The PVC between gateway 74AA and ISP 90AA is represented by the dotted line indicated at 92AA. The PVC between gateway 74AA and subscriber site 58AA is represented by the dotted line indicated at 76AA. Referring now to FIG. 9, when operating in a standard mode, Internet 94AA is connected to subscriber site 58AA along the path indicated at A via PVC 76AA and PVC 92AA. Put in other words, when system 50AA is in standard mode, PVC 76AA and PVC 92AA are connected by gateway 74AA.

Figure 10:
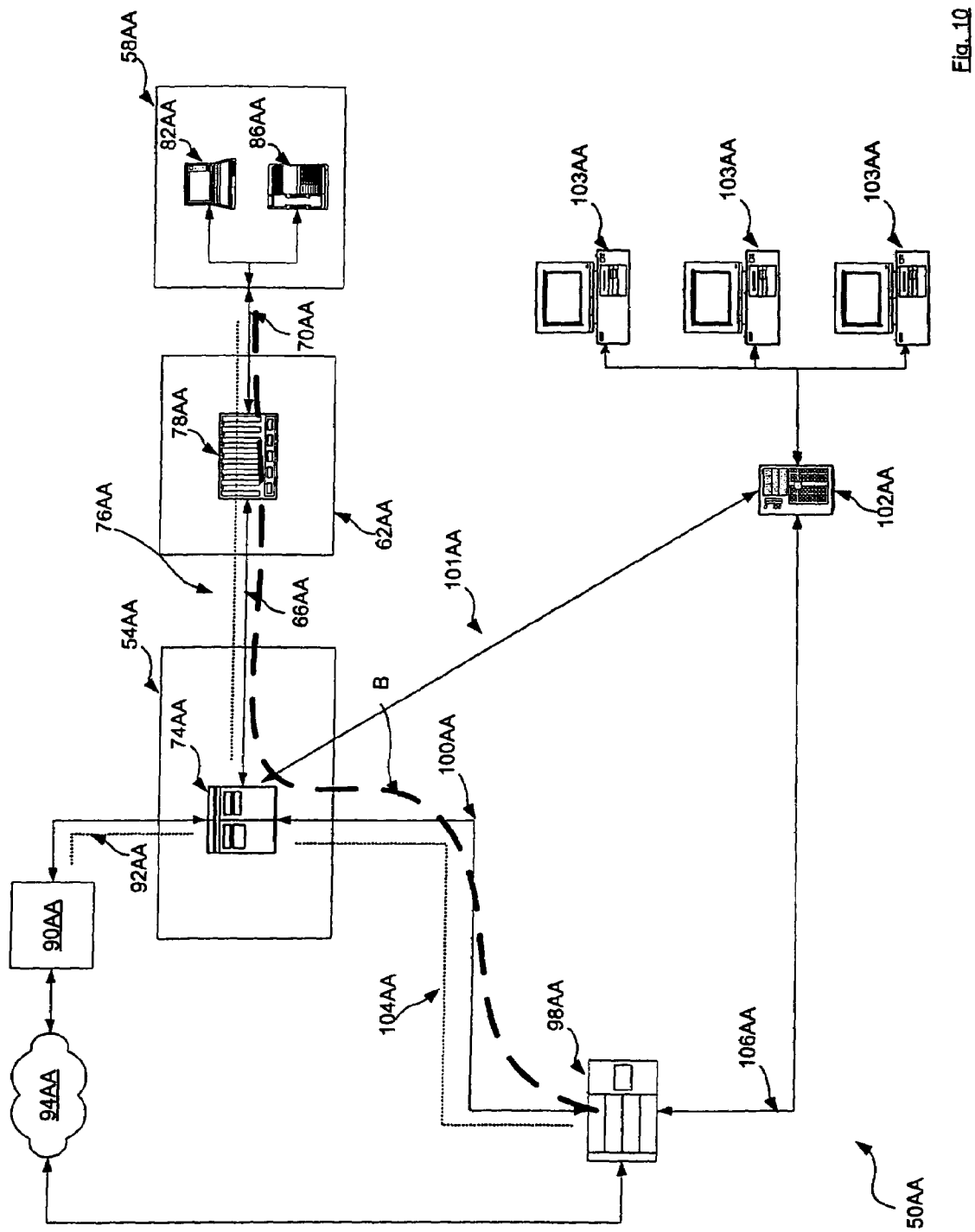
FIG. 10 shows the system of FIG. 8 operating in a subscriber test mode.

Gateway 74AA in central office 54AA is also connected to a test apparatus 98AA. The PVC between test apparatus 78AA and central office 54AA is represented by the dotted line indicated at 104AA. In a present embodiment, the PVCs in gateway 74AA are remotely switchable, via instructions received over an internal network 101AA, in order to change the connections in gateway 74AA between:

(a) the standard mode shown in FIG. 9;
(b) a subscriber test mode, wherein test apparatus 98AA is connected to subscriber site 58AA, such that PVC 104AA is connected to PVC 76AA, as shown in FIG. 10, and;
(c) an Internet test mode wherein test apparatus 98AA is connected to Internet 94AA via ISP 90AA, such that PVC 104AA is connected to PVC 92AA, as shown in FIG. 11.

Referring to FIG. 10, when system 50AA is operating in subscriber test mode, such that PVC 104AA is connected to PVC 76AA, test apparatus 98AA is connected to subscriber site 58AA along the path indicated at B, and subscriber site 58AA is disconnected from Internet 94AA. In order to effect subscriber test mode, it is contemplated that test apparatus 98AA will be configured to mimic the network connections to Internet 94AA offered by ISP 90AA to subscriber site 58AA. In other words, subscriber site 58AA will experience an attempt to connect to Internet 94AA. For example, where connections with ISP 90AA from subscriber site 58AA are made using Point-to-Point Protocol Over Ethernet ("PP-POE"), and thus ISP 90AA will include a remote access server ("RAS") in order to effect PPPOE authentications from subscribers, then test apparatus 98AA be configured to mimic such PPPOE authentications that are xperienced by subscriber site 58AA when system 50AA is in the standard mode shown in FIG. 9.

Figure 11:
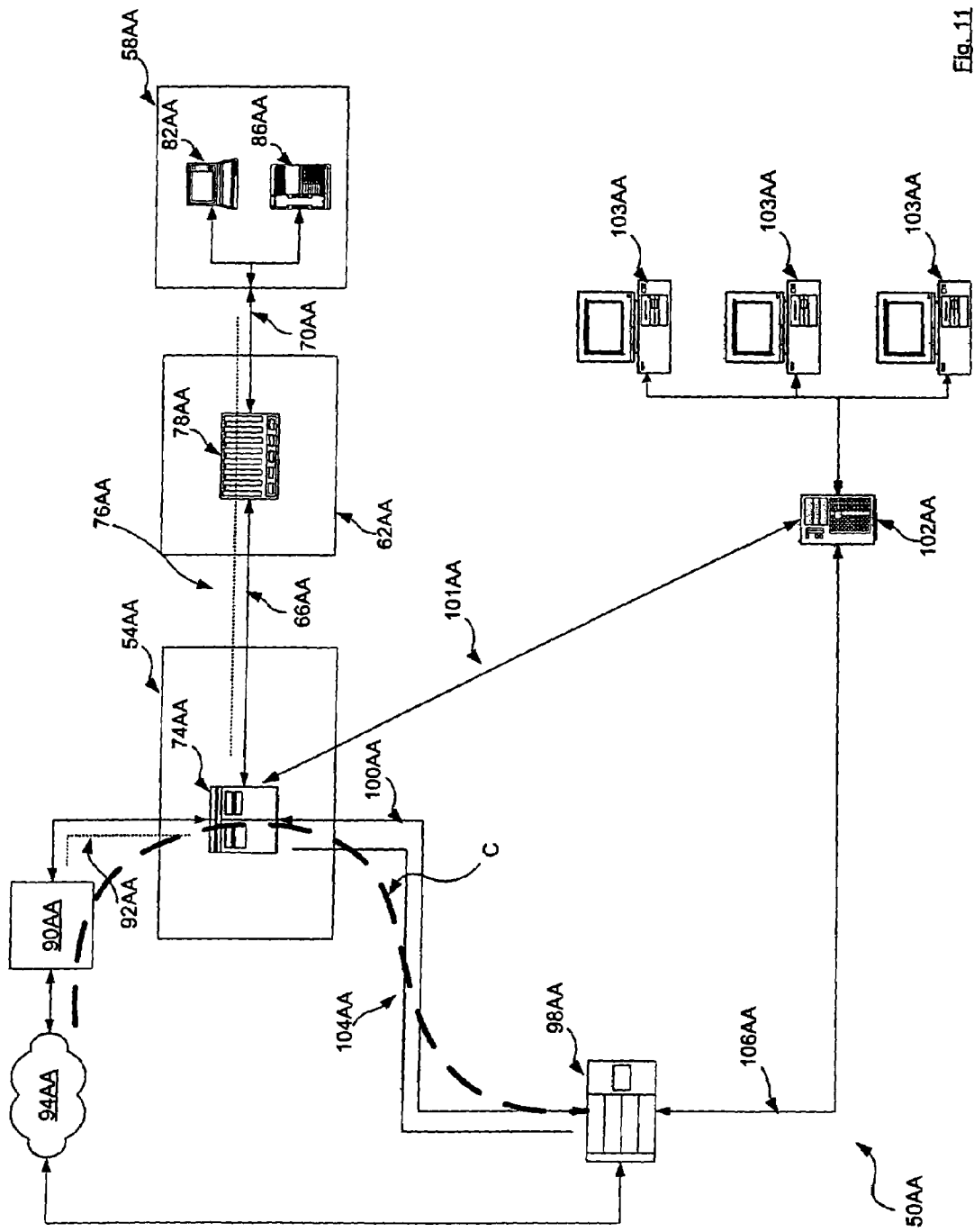
FIG. 11 shows the system of FIG. 8 operating in an Internet test mode.

By the same token, and referring to FIG. 11, when system 50AA is operating in Internet test mode, such that PVC 104AA is connected to PVC 92AA, test apparatus 98AA is connected to subscriber site 58AA along the path indicated at C, and subscriber site 58AA is disconnected from Internet 94AA. In order to effect Internet test mode, it is contemplated that test apparatus 98AA will be configured to mimic subscriber site 58AA and, so mimicking subscriber site 58AA, attempt to connect with Internet 94AA via ISP 90AA. For example, where subscriber site 58AA connects with ISP 90AA via PPPOE authentication, then when test apparatus 98AA attempts to connect with ISP 90AA, test apparatus 98AA will attempt a PPPOE authentication with ISP 90AA in substantially the same manner as subscriber site 58AA would attempt to do a PPPOE authentication with ISP 90AA when system 50AA is in the standard mode shown in FIG. 9.

While the present example refers to PPPOE, other connection initiation can be used, such as point to point over ATM, Dynamic Host Configuration Protocol ("DHCP"), etc., as desired, regardless of the type of physical connection used, and according to service levels guaranteed to customers, and customer profiles.

It is contemplated that, in some embodiments, a single test apparatus 98AA can be used with a plurality of central offices 54AA, being dynamically connectable to each central office 54AA via a link 100AA or other type of network managed by the service provider(s) that own and/or operate central office 54AA and test apparatus 98AA. In this manner, one test apparatus 98AA could be used across a large geographic area such as an entire country or continent. Such a link can be based on an asynchronous transfer mode ("ATM"), or Gigabit Ethernet ("GigE") or other type of network internally managed by a service provider. In other embodiments it can be desired to use a plurality of test apparatuses 98AA as desired. In a present embodiment, test apparatus 98AA also has a direct connection to Internet 94AA, the details of which will be explained further below. Thus, it is contemplated that test apparatus 98AA can be owned and/or operated by one entity, while central office 54AA and OPI 62AA are owned and operated by a different entity, thereby allowing the entity that owns central office 54AA and OPI 62AA to outsource the network connection testing functions to the owner/operator of test apparatus 98AA.

System 50AA also includes at least one customer care computing apparatus 102AA that connects to test apparatus 98AA via a link 106AA or other type of network managed by the service provider(s) that own and/or operate test apparatus 98AA. Computing apparatus 102AA is operable to deliver instructions to test apparatus 98AA, and receive the results of tests performed by test apparatus 98AA. Computing apparatus 102AA also connects to gateway 74AA via internal network 101AA, which can be a GigE or an ATM network, etc., in order to instruct gateway 74AA in the connections of PVCs, and therefore determine the operating mode of system 50AA. The computing apparatus is shown in system 50AA is typically connected to a plurality of customer care workstations 103AA, each operated by customer service representatives, who are able to receive voice calls (or other communications) from subscribers reporting difficulties, and who are able to issue instructions to test apparatuses 98AA in order to ascertain the nature of those network connections problems. The owner and/or operator of computing apparatus 102AA is typically, though not necessarily, the same as the owner/operator of test apparatus 98AA. By the same token, computing apparatus 102AA can be incorporated directly into test apparatus 98AA, and thereby obviate the need for link 106AA to effect a remote connection, and/or obviate the need for link 101AA. While presently less preferred, in other embodiments the functionality of computing apparatus 102AA and test apparatus 98AA and gateway 74AA can also be integrated into a single device.

Figure 12:
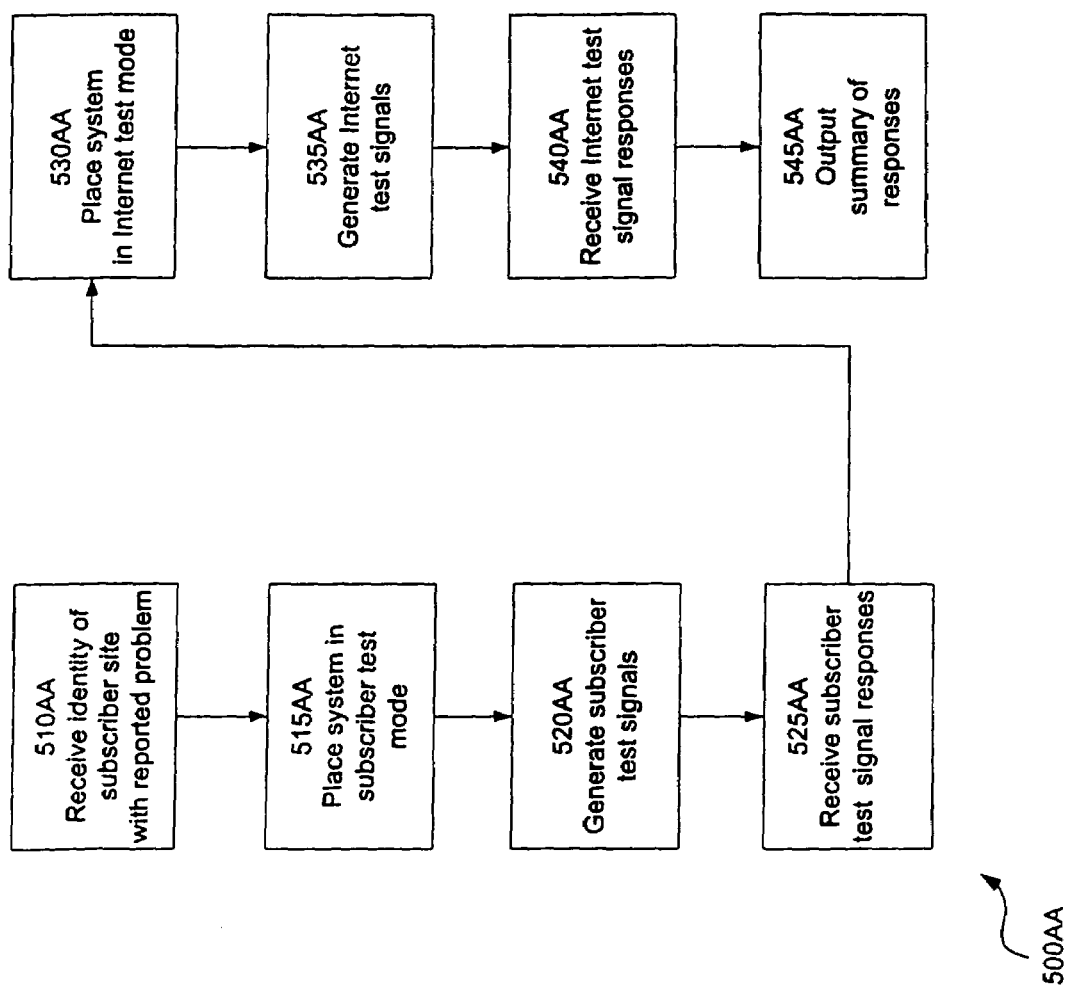
FIG. 12 is a flowchart depicting a method of testing network connections in accordance with another embodiment of the invention; and, FIG. 13 is a schematic representation of a system for testing network connections in accordance with another embodiment of the invention.

Reference will now be made to FIG. 12 which shows a flowchart depicting a method for testing network connections which is indicated generally at 500AA. In order to assist in the explanation of the method, it will be assumed that method 500AA is performed using system 50AA. However, it is to be understood that system 50AA and/or method 500AA can be varied, and need not work exactly as discussed herein in conjunction with each other, and that such variations are within the scope of the present invention. Before discussing the method, it will be assumed that a connection at the physical layer between Internet 94AA and subscriber site 58AA exists, and it will also be assumed that system 50AA is operating in standard mode, as shown in FIG. 9, in that there is a connection between Internet 94AA and subscriber site 58AA, but that test apparatus 98AA is connected to neither Internet 94AA or subscriber site 58AA via central office 54AA.

Beginning first at step 510AA, the identity of a subscriber site experiencing network connections problems is received. Using system 50AA as an example, this step is performed as the user at subscriber site 58AA contacts a customer service representative at computing apparatus 102AA to report a problem. (While not part of the present embodiment, in the alternative, the customer service representative or other representative of the service provider could start network connections proactively, without having it initiated by the subscriber.) Having received the identity of the subscriber site, method 500AA will advance to step 515AA.

At step 515AA, the customer service representative operating one of the workstations 103AA connected to computing apparatus 102AA will issue an instruction to computing apparatus 102AA, which will issue an instructions to test apparatus 98AA and gateway 74AA to place the system in the subscriber test mode. Using a graphical user interface ("GUI") or other means of providing input to the workstation 103AA, the customer service representative will enter in the appropriate instructions, appropriate portions of which are passed to test apparatus 98AA and gateway 74AA respectively via computing apparatus 102AA, which in turn causes system 50AA to enter into the subscriber test mode shown in FIG. 10.

Next, at step 520AA, a plurality of subscriber test signals are issued from test apparatus 98AA in order to test network connections between test apparatus 98AA and subscriber site 58AA. More particularly, such subscriber tests evaluate network connections between central office 54AA and subscriber site 58AA. The type of test signals is not particularly limited, and can be chosen based on the layer in the protocol stack (e.g. the Open Systems Interconnection ("OSI") Reference Model) being tested, and/or the type of data service at subscriber site 58AA that is being affected and/or such other criteria as may be desired. For example, assuming that the data service being affected at subscriber site 58AA was web-browsing on computing device 82AA, then test apparatus 98AA can be instructed to issue a plurality of "ping" commands via the Internet Control Message Protocol ("ICMP") to subscriber site 58AA. Based on the information received back in those "pings", test apparatus 98AA can make certain determinations about the network connections between central office 54AA and subscriber site 58AA.

Other types of network connection tests can be performed, such as tests for throughput of Ethernet frames or transport control protocol/internet protocol ("TCP/IP") packets. Again, such tests can be chosen based on any desired characteristics of the type of subscriber device or application or characteristic of the layer in the protocol stack. As another example, where difficulty is being experienced with VoIP calls from telephone device 86AA, then test apparatus 98AA can be used to monitor the quality of outbound VoIP calls from device 86AA in order to test for network connections issues.

Next, at step 525AA, subscriber test signal responses are received. Thus, the results of the tests performed at step 520AA are gathered and collected at test apparatus 98AA.

At step 530AA, the customer service representative operating one of the workstations 103AA connected to computing apparatus 102AA will issue instructions to computing apparatus 102AA, which will issue an instructions to test apparatus 98AA via link 106AA and to gateway 74AA via link 101 AA to place the system in the Internet test mode. Using a graphical user interface ("GUI") or other means of providing input to the workstation 103AA, the customer service representative will enter in the appropriate instructions into the workstation for delivery to computing apparatus 102AA. In turn these instructions are passed to test apparatus 98AA and gateway 74AA, causing system 50AA to enter into the Internet test mode shown in FIG. 11.

At step 535AA, Internet test signals are generated. In a present embodiment, a plurality of subscriber test signals are issued from test apparatus 98AA in order to test network connections between test apparatus 98AA and Internet 94AA. More particularly, such Internet tests evaluate network connections between central office 54AA and Internet 94AA via ISP 90AA. The type of test signals is not particularly limited, and can be chosen based on the layer in the protocol stack (e.g. the Open Systems Interconnection ("OSI") Reference Model) being tested, and/or the type of data service at subscriber site 58AA that is being affected and/or such other criteria as may be desired. For example, assuming that the data service being affected at subscriber site 58AA was web-browsing on computing device 82AA, then test apparatus 98AA can be instructed to issue a plurality of "ping" commands via the ICMP to some destination site on Internet 94AA. Based on the information received back in those "pings", test apparatus 98AA can be able to make certain determinations about the network connections between central office 54AA and Internet 94AA. Additionally, using link 107AA, the direct connection between test apparatus 98AA and Internet 94AA, test apparatus 98AA is able to look for a round trip time (i.e. latency) of packets that are sent from test apparatus 98AA, through central office 54AA to Internet 94AA, and then back to test apparatus 98AA via the direct connection between test apparatus 98AA and Internet 94AA. A plurality of other tests can be performed by using both the direct connection between test apparatus 98AA and Internet 94AA and the connection between test apparatus 98AA and Internet 94AA that runs via central office 54AA.

Other types of network connection tests can be performed, such as tests for throughput of Ethernet frames or transport control protocol/internet protocol ("TCP/IP") packets. Again, such tests can be chosen based on any desired characteristics of the type of subscriber device or application or characteristic of the layer in the protocol stack.

Next, at step 540AA, subscriber test signal responses are received. Thus, the results of the tests performed at step 540AA are gathered and collected at test apparatus 98AA.

At step 545AA, an output summarizing the responses from steps 525AA and 540AA is generated. Such a summary is prepared using test apparatus 98AA and output to computing apparatus 102AA so that the customer service representative at the appropriate workstation can take further corrective action to remedy any network connections issues found in the summary. Such corrective action can include dispatching repair teams to such portions of the pathway between Internet 94AA and subscriber premises 58AA as are identified as having specific network connections issues.

It should now be understood that method 500AA (and system 50AA) can be modified so that only a subscriber test in subscriber test mode is performed (i.e. by omitting steps 530AA-540AA), or so that only an Internet test in the Internet test mode is performed (i.e. by eliminating steps 515AA-525AA).

It should now be understood that the types of network connection tests performed at steps 520AA and 535AA are not particularly limited. In general, any one of plurality of quality of service ("QOS") tests can be performed. Such QOS tests can include, for example, constant bit rate tests, time delay tests, tests involving the introduction of jitter, noise, bad or defective packets, tests involving cyclic redundancy checks, tests involving packet loss using the VoIP SIP protocol, and the like. Such QOS tests can be performed to verify service level agreements that are also based on such QOS tests.

Various ways to implement such QOS tests in test apparatus 98AA will now occur to those of skill in the art. For example, in certain embodiments test apparatus 98AA can be based on an off-the-shelf test head such as the Spirent Adtech AX4000 from Spirent Communications, 15200 Omega Drive, Rockville, Md. 20850. When so used for test apparatus 98AA, test apparatus 98AA will thus be operable to perform the full range of network connection tests currently available in Spirent Adtech AX4000. In these embodiments the Spirent Adtech AX4000 is modified to be remotely controlled by computing apparatus 102AA, and thus the Spirent Adtech AX4000 is configured to remotely accept instructions from computing apparatus 102AA, and to return results thereto. Thus, the tests actually generated by the Spirent Adtech AX4000 will be based on such QOS tests as will provide the desired type of network connection tests.

It is to be understood that the network connection tests used for the subscriber test signals at step 520AA can have a level of sophistication corresponding to the hardware and software features of devices 82AA and/or 86AA at subscriber site 58AA. When using a prior art digital subscriber line ("DSL") modem at subscriber site 58AA to connect to device 82AA, such network connection tests can be simply based on ICMP "pinging" as previously described. However, where the DSL modem at subscriber site 58AA is enhanced to include firmware that allow it to be remotely controlled to activate higher level applications, then more sophisticated tests can be performed. (As used herein, the term higher level applications refers to applications that execute on the levels of the Open Systems Interconnection ("OSI") Reference Model that are higher than those used to delivery ICMP packets) An example of a DSL modem with such enhanced firmware is discussed in applicant's co-pending patent application entitled SUBSCRIBER STATION, bearing patent application U.S. Pat. No. 2,454,408, and filed in the Canadian patent office on Dec. 30, 2003, the contents of which are incorporated herein by reference.

It can also be desired to provide test apparatus 98AA with functionality needed to allow a subscriber or other individual at subscriber site 58AA to perform their own network connection tests from device 82AA or such other devices as may be connected at site 58AA. Such network connection tests can be used to allow the subscriber to satisfy themselves that network connections actually exist, and that service level agreements with the subscriber are being met—all without the need for a truck roll to subscriber site 58AA. As a simple example, an individual operating device 82AA while system 50AA is in subscriber test mode shown in FIG. 9 can enter their own "ping" commands (or the like) into device 82AA, to "ping" test apparatus 98AA and thereby receive basic ping statistics. Where a DSL modem at site 58AA includes the above-mentioned enhanced firmware to allow that modem to activate higher level applications during connection to test apparatus 98AA, then test apparatus 98AA can be configured to host a web page that is accessible by a web-browser executing on device 82AA. In this situation, such a web page hosted at test apparatus 98AA can include a number of user friendly features so that the customer at device 82AA can interact with such a website and be given demonstrations that network connections exists, and is healthy, between subscriber site 58AA and gateway 74AA. In an embodiment, an individual operating device 82AA could initiate system 50AA to initiate subscriber test mode by visiting a website hosting a website operated by ISP 90AA, subject to implementation of appropriate security measures to reduce the likelihood of unauthorized use.

Figure 13:
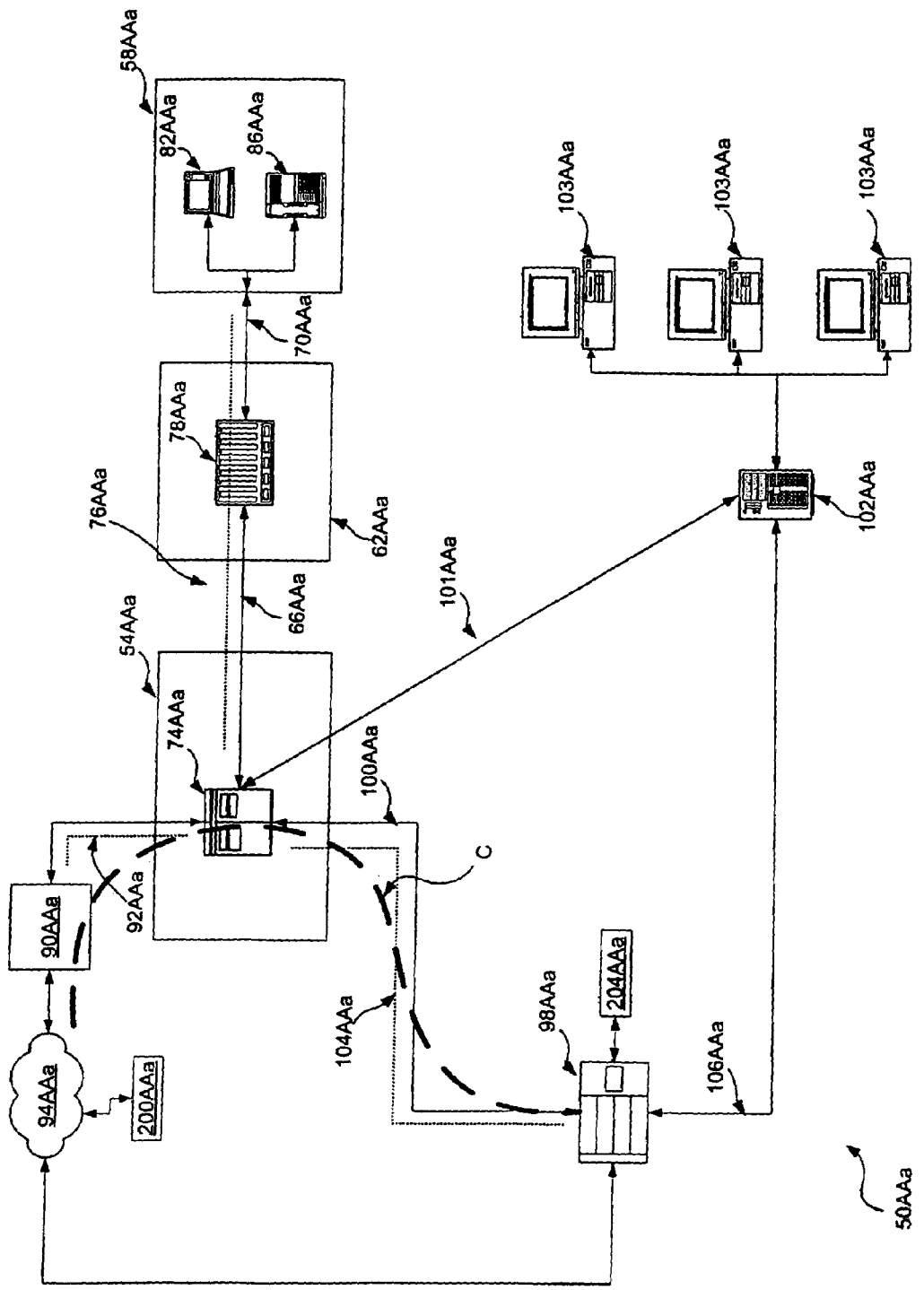

Referring now to FIG. 13 a system in accordance with another embodiment of the invention is indicated generally at 50AAa. System 50AAa includes the same components as system 50AA, and like components in system 50AA bear the same reference as their counterparts in system 50AA, except with the suffix "a". In addition to the components found in system 50AA, system 50AAa also includes a remote tester 200AAa and a local clock 204AAa attached to test apparatus 98AAa. System 50AAa is particularly configured for testing VoIP network connections from gateway 74AAa out to Internet 94AAa. Thus, when system 50AAa is in Internet test mode, test apparatus 98AAa will be instructed to perform a number of network connection tests to Internet 94AAa to verify various quality of service ("QOS") parameters that are relevant to VOIP, those tests typically being based on the Session Initiation Protocol ("SIP") including tests for throughput, jitter, delay, etc. and such other tests as will now occur to those of skill in the art.

In addition any other QOS tests that can be desirable to perform, test apparatus 98AAa is also operable perform a delay test to determine any delay in a VoIP call made from test apparatus 98AAa to Internet 94AAa. Thus, local clock 204AAa will include a clock, such as a clock based on a global positioning system ("GPS") device for high accuracy, and thus the time of origination of packets from an outbound simulated VoIP call from test apparatus 98AAa to Internet 94AAa will be recorded based on time stamp information gathered from GPS satellites. Such an outbound simulated VOIP call will be destined for remote tester 200AAa that is located at a remote location on Internet 94AAa. Remote tester 200AAa will thus also include a GPS device, so that the exact time of arrival of those simulated VoIP packets sent from tester 98AAa can be recorded. The information about when those simulated VoIP packets arrived at remote tester 200AAa can then be sent back to tester 98AAa via the direct connection between Internet 94AAa and tester 98AAa. A comparison can then be made between the time of origination of the VoIP packets from tester 98AAa, and the time of arrival of those VoIP packets at remote tester 200AAa. Such a comparison can reveal if there are any unexpected or undesirable delays along pathway C, and thereby allow test apparatus 98AAa to report these back to computing apparatus 102AAa, and in turn to the appropriate workstation, so that corrective action can be taken. It should now be understood that, in other embodiments, other types of high accuracy clocks can also be used other than a clock based on GPS.

Figure 14:
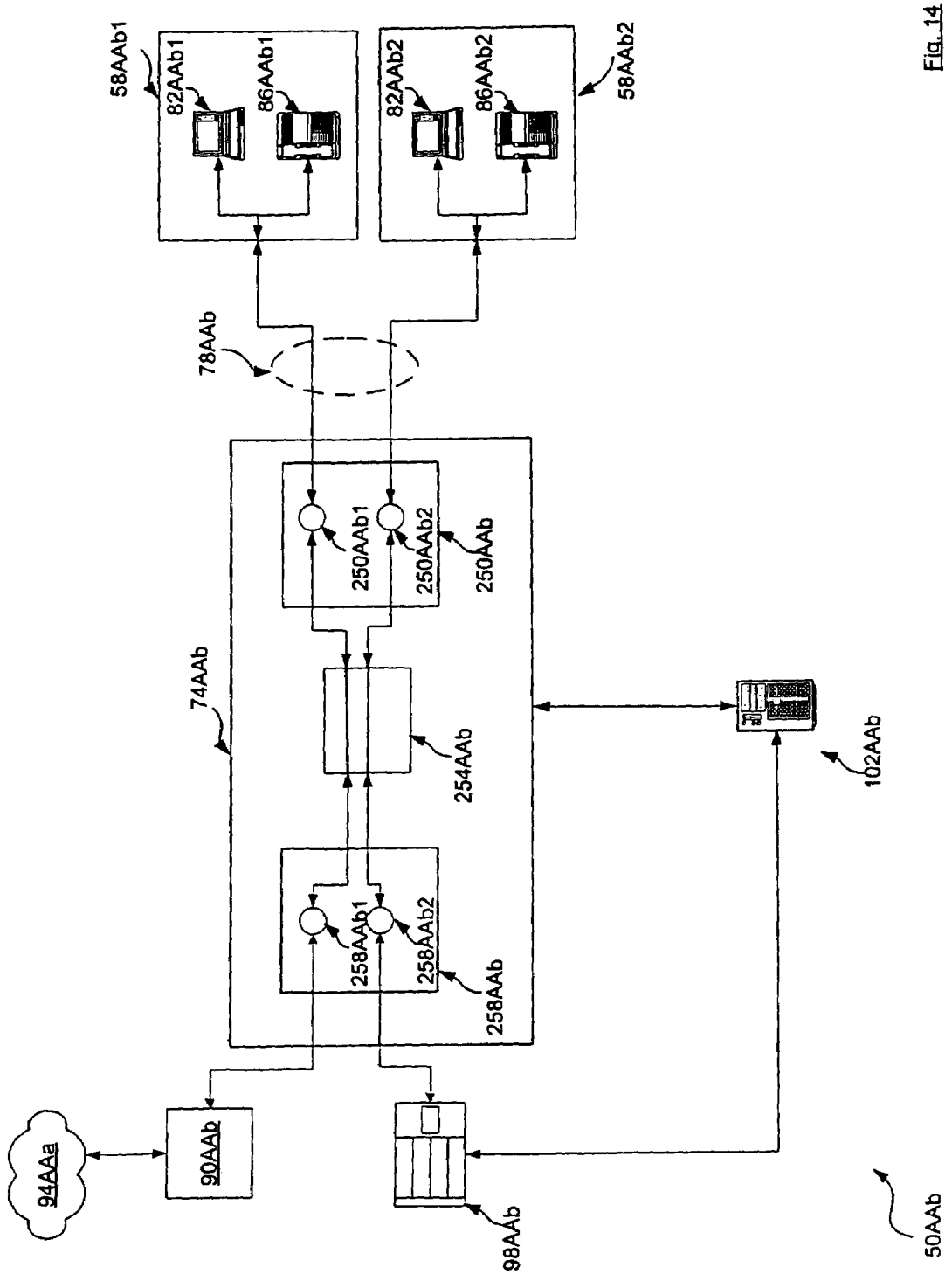
FIG. 14 is a schematic representation of a system for testing network connections in accordance with another embodiment of the invention.

As previously mentioned, gateway 74AA (or gateway 74AAa) can be implemented using a Stinger® that includes a plurality of permanent virtual circuits ("PVC") which allow remote switching of various subscriber stations to ISPs and/or test apparatuses, in accordance with the various modes shown in FIGS. 9, 10 and 11. Thus, while a Stinger® is used in gateway 74AA, it is to be understood that any type of means to effect switching between subscriber stations, ISPs and test apparatuses can be used. A general representation of such means for switching is shown as system 50AAb in FIG. 14, wherein like elements in system 50AAb to like elements in system 50AA bear the same reference number but are followed by the suffix "b". System 50AAb can thus be implemented using a Stinger® for gateway 74AAb or any other type of technology to provide substantially similar means for switching. In FIG. 14, system 50AAb includes a plurality of subscriber sites 58AAb1 and 58AAb2 (and could include additional subscriber sites beyond the two shown in FIG. 14). In system 50AAb, gateway 74AAb includes a controller 254AAb that moderates communications between ISP 90AAb or test apparatus 98AAb, and subscriber sites 58AAb1 and 58AAb2, according to the positioning of the means for switching within gateway 74AAb. System 50AAb includes a first set of virtual switches 250AAb that connect controller 254AAb to each subscriber site 58AAb1 and 58AAb2. First set of virtual switches 250AAb includes a first switching element 250AAb1 that connects controller 254AAb to subscriber site 58AAb1, and a second switching element 250AAb2 that connects controller 254AAb to subscriber site 58AAb2. Each switching element 250AAb1 and 250AAb2 can thus be remotely controlled by computing apparatus 102AAb in order to assign a particular switching element to a particular subscriber site. According to the orientation of the switch element, a virtual circuit is created between the controller and the subscriber site.

By the same token, system 50AAb also includes a second set of switching elements 258AAb that connect controller 254AAb (and in turn a particular subscriber site) to either ISP 90AAb or to test apparatus 98AAb. In the example shown in FIG. 14, subscriber site 58AAb1 is shown connected to ISP 90AAb while subscriber site 58AAb2 is shown connected to controller 254AAb. Thus, in FIG. 14, subscriber site 58AAb1 is shown in the "standard mode", while subscriber site 58AAb2 is shown in the "subscriber test mode". In general, such switching elements render gateway 74AAb operable to allow a subscriber site 58AAb1 or 58AAb2 to connect either to ISP 90AAb or to test apparatus 98AAb, all via remote instruction to gateway 74AAb from computing apparatus 102AAb. It will now be apparent that gateway 74AAb can be implemented via Stinger® or other means, as desired.

Figure 15:
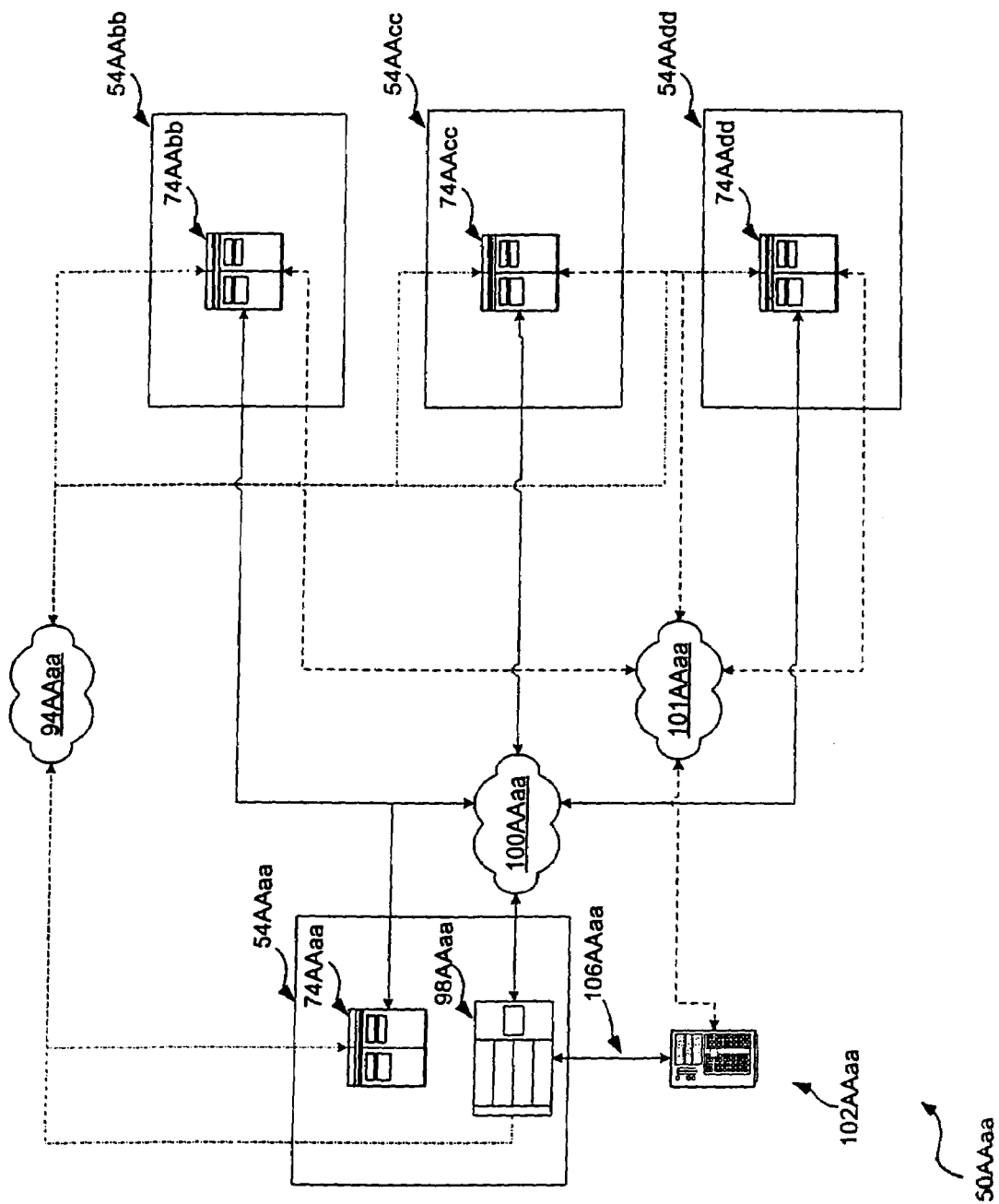
FIG. 15 is a schematic representation of a system for testing network connections in accordance with another embodiment of the invention; and, FIG. 16 shows certain components of the system of FIG. 15 in greater detail.

Variations on and/or combinations of the configurations in system 50AA, system 50AAa and system 50AAb are within the scope of the invention. For example, it is to be understood that a test apparatus, such as test apparatus 98AA, can be located in any location in relation to the one or more central offices that are served by that test apparatus. By the same token, a single test apparatus can actually be situated in one central office, where that central office is connected to a plurality of different central offices to be serviced by that test apparatus. Such an exemplary configuration is shown as system 50AAaa in FIG. 15, wherein like elements in system 50AAaa to like elements in system 50AA bear the same reference number but are followed by a double-letter suffix of the format "xx". System 50AAaa thus includes a single test apparatus 98AAaa that is situated in one central office 54AAaa and sitting adjacent to one gateway 74AAaa, but the same test apparatus 98AAaa is also connected to a plurality of other gateways 74AAbb, 74AAcc, 74AAdd located in other central offices 54AAbb, 54AAcc, 54AAdd respective thereto. (While not shown in system 50AAaa in order to simplify the presentation of FIG. 15, it is to be understood that gateways 74AAaa, 74AAbb, 74AAcc, and 74AAdd each serve a plurality of different OPIs 62AA, which in turn serve a plurality of different subscriber premises 58AA as previously described.) It should now be understood that in this configuration, each central office 54AAaa, 54AAbb, 54AAcc, 54AAdd can be owned and/or operated by one or more different carriers. For example, where central offices 54AAbb, 54AAcc, and 54AAdd are owned and operated by a first carrier while central office 54AAaa is owned and operated by a second carrier, then the second carrier can enter into a service contract with the first carrier whereby the second carrier performs the connection testing as described herein on behalf of the first carrier. As an alternative, a test apparatus 98AA can be situated in each central office 54AA. Still further alternative configurations will now occur to those of skill in the art.

Figure 16:
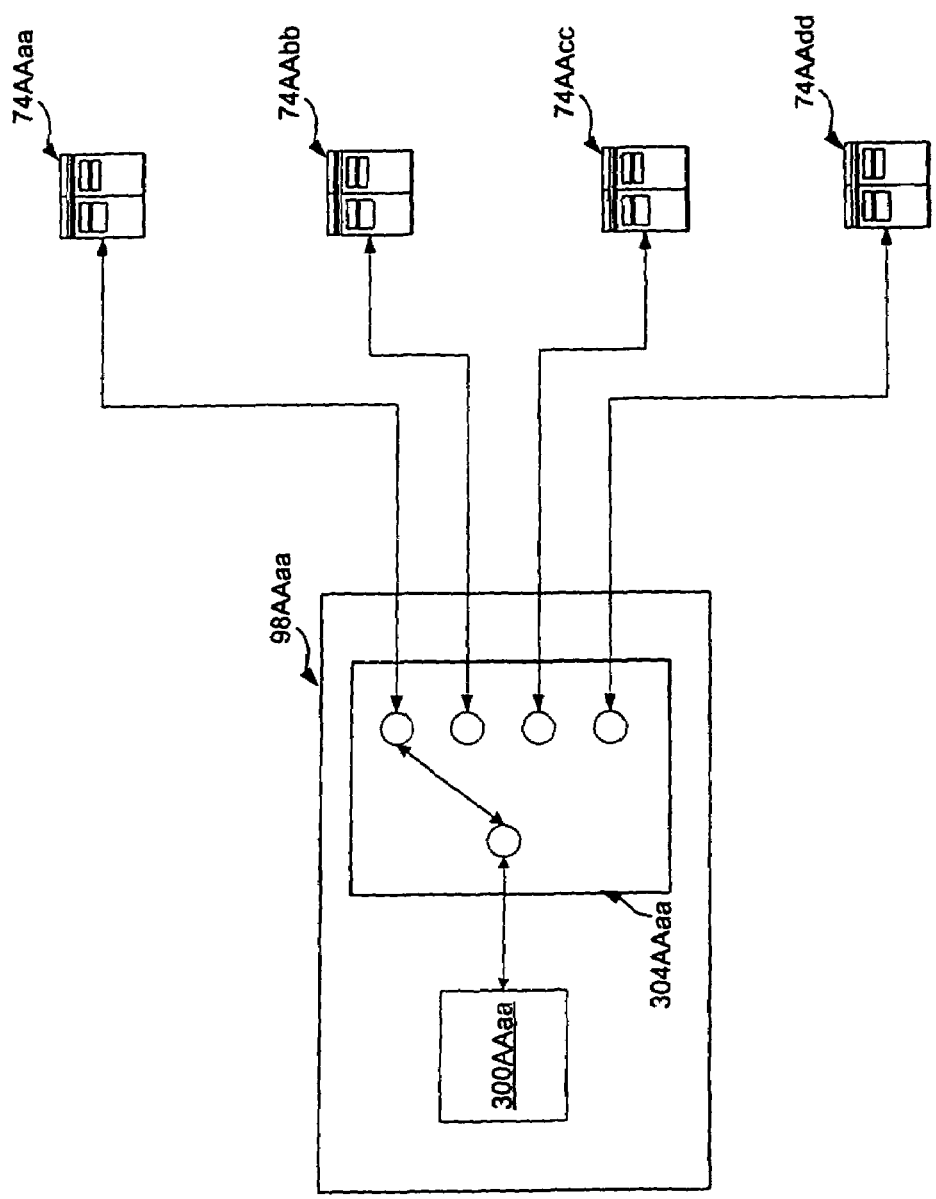

It should now be understood that test apparatus 98AAaa in system 50AAaa includes both tester functionality and switching functionality. This is represented in a simplified format in FIG. 16, wherein test apparatus 98AAaa is shown including a test head 300AAaa, and a switch 304AAaa. In FIG. 16, switch 304AAaa is shown as connecting test head 300AAaa to gateway 74AAaa. The switch 304AAaa is thus operable to connect test head 300AAaa to any of gateways 74AAaa, 74AAbb, 74AAcc and 74AAdd. Switch 304AAaa can be accomplished using any hardware and/or software techniques known in the art—such as by utilizing PVCs that are part of the inherent functionality of known gateways 74AA, as previously described. It should also be understood that, where tester 300AAaa is operable to test multiple subscriber premises simultaneously, then switch 304AAaa can be operable to simultaneously connect tester 300AAaa to multiple corresponding gateways 74AA. It is to be further understood that the number of gateways 74AA to which test head 300AAaa can simultaneously connect is not particularly limited, and that switch 304AAaa can be modified to thus connect is not limited. In a presently preferred embodiment of a test head 300AAa, the test head 300AAa has twenty ports to which various gateways 74AA can simultaneously connect via switch 304AAaa.

While only specific combinations of the various features and components of the present invention have been discussed herein, it will be apparent to those of skill in the art that desired subsets of the disclosed features and/or components and/or alternative combinations of these embodiments, and the features and components thereof, can be utilized, as desired. For example, the teachings herein can be combined with the teachings found in the applicant's co-pending patent application entitled METHOD AND SYSTEM FOR CONNECTION VERIFICATION, bearing patent application Ser. No. 10/670,261, and filed in the United States Patent Office on Sep. 26, 2003, the contents of which are incorporated herein by reference.

It is to be understood that links 100AA, 101AA, 106AA and 107AA in system 50AA (and its variants in system 50AAa and system 50AAaa) are represented as being separate physical links in order to simplify their explanation, but it is to be understood that other means of effecting those links, either physically or virtually, are within the scope of the invention.

While various embodiments are described above, it will be appreciated by those of skill in the art that various terms used to describe certain concepts, features and/or components of these embodiments can be substantially interchangeable in meaning, but according to the appropriate context and surrounding language for each embodiment in which the particular term is used. For example, the terms "subscriber device" in system 50AA, and "subscriber station" in system 30, are substantially interchangeable with each other; the terms "computing apparatus" in system 50AA and "access verification host" in system 30 are substantially interchangeable.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method of verifying at least a portion of a connection between a subscriber station having a dynamic IP address and a network wherein a gateway resides intermediate the subscriber station and the network, the method comprising:
   introducing a tester into the connection;
   after introducing the tester into the connection, remotely providing the dynamic IP address to the tester via a DHCP server;
   sending the dynamic IP address from the tester to a verification host connected to the tester via a virtual link through the network;
   the verification host instructing the tester to perform at least one connectivity test between the gateway and the network; and
   the tester generating an output to the verification host reporting a result of the at least one connectivity test.

2. The method according claim 1 wherein the gateway is a DSLAM.

3. The method according to claim 2 wherein the portion of the connection between the gateway and the subscriber station includes a copper twisted pair.

4. The method according to claim 1 wherein the network is a proprietary network belonging to an internet service provider.

5. The method according to claim 1 wherein the network is the Internet and the portion of the connection between the gateway and network is a backhaul.

6. The method according to claim 1 wherein the tester is introduced via a remote instruction.

7. The method according to claim 1 wherein the tester is introduced into the connection at the gateway.

8. The method according to claim 6 wherein the gateway is a DSLAM at a telephone central office and the tester is introduced using a manual connection.

9. The method according to claim 1 further comprising:
   remotely instructing the tester to perform at least one additional connectivity test between the gateway and the subscriber station,
   wherein the output includes a result of the at least one additional connectivity test.

10. The method according to claim 9 wherein the at least one additional connectivity test is a metal test of a copper twisted pair that forms at least part of the connection between the gateway and the subscriber station.

11. The method according to claim 1 wherein the at least one connectivity test comprises "pinging" the tester from the host via the Internet.

12. The method according to claim 11 wherein the report includes ping statistics delivered to the host.

13. A method of verifying at least a portion of a connection between a subscriber station and a network wherein a gateway resides intermediate the subscriber station and the network, the method comprising:
   introducing a tester into the connection;
   remotely instructing the tester to perform at least one connectivity test between the gateway and the network; and
   generating an output reporting a result of the at least one connectivity test,
   wherein the remote instructions originate from a verification host connected to the tester via a virtual link through the network and the report is outputted to the verification host, and
   wherein the subscriber station has a static IP address and further comprising the step of remotely providing the static IP address to the tester via the link.

14. A system for verifying at least a portion of a pathway between a subscriber station and a network comprising:
   a gateway intermediate the subscriber station and the network, the gateway operable to translate communications between the subscriber station and the network;
   a tester for connection into the pathway, the tester operable to receive remote instructions to perform at least one connectivity test between the gateway and the network;
   a host connected to the tester for remotely instructing the tester to perform the at least one connectivity test and to receive reports thereof from the tester, the host connected to the tester via a virtual link through the network; and
   a DHCP server operable to assign an IP address to the subscriber station and further operable to assign an IP address to the tester when the tester is introduced into the pathway, the tester further operable to send the dynamic IP address from the tester to the host via the network.

15. The system according to claim 14 wherein the gateway is a DSLAM.

16. The system according to claim 15 wherein the portion of the pathway between the gateway and the subscriber station includes a copper twisted pair.

17. The system according to claim 14 wherein the network is the Internet and the portion of the pathway between the gateway and network is a backhaul.

18. The system according to claim 14 wherein the tester is further operable to be selectively connected to and disconnected from the pathway via a remote instruction from the host.

19. The system according to claim 18 wherein the tester is operable to be selectively connected to and disconnected from the pathway via a manual connection.

20. The system according to claim 18 wherein the gateway is a DSLAM at a telephone central office and the tester is connected to the DSLAM using a manual connection.

21. The system according to claim 14 wherein the tester is further operable to conduct a metal test between the gateway and the subscriber station and wherein the output includes a result of the metal test.

22. The system according to claim 14 wherein the network is the Internet.

23. The system according to claim 22 wherein the at least one connectivity test comprises "pinging" the tester from the host via the Internet.

24. The system according to claim 23 wherein the report includes ping statistics delivered to the host.

25. A system for verifying at least a portion of a pathway between a subscriber station and a network comprising:
   a gateway intermediate the subscriber station and the network, the gateway operable to translate communications between the subscriber station and the network;
   a tester for connection into the pathway, the tester operable to receive remote instructions to perform at least one connectivity test between the gateway and the network; and
   a host connected to the tester for remotely instructing the tester to perform the at least one connectivity test and to receive reports thereof from the tester, the host connected to the tester via a virtual link through the network,
   wherein the subscriber station has a static IP address and wherein the host is further operable to providing the static IP address to the tester via the link.

26. The method according claim 13 wherein the gateway is a DSLAM.

27. The method according to claim 26 wherein the portion of the connection between the gateway and the subscriber station includes a copper twisted pair.

28. The method according to claim 13 wherein the network is a proprietary network belonging to an internet service provider.

29. The method according to claim 13 wherein the network is the Internet and the portion of the connection between the gateway and network is a backhaul.

30. The method according to claim 13 wherein the tester is introduced via a remote instruction.

31. The method according to claim 13 wherein the tester is introduced into the connection at the gateway.

32. The method according to claim 31 wherein the gateway is a DSLAM at a telephone central office and the tester is introduced using a manual connection.

33. The method according to claim 13 further comprising:
   remotely instructing the tester to perform at least one additional connectivity test between the gateway and the subscriber station,
   wherein the output includes a result of the at least one additional connectivity test.

34. The method according to claim 33 wherein the at least one additional connectivity test is a metal test of a copper twisted pair that forms at least part of the connection between the gateway and the subscriber station.

35. The method according to claim 13 wherein the at least one connectivity test comprises "pinging" the tester from the host via the Internet.

36. The method according to claim 35 wherein the report includes ping statistics delivered to the host.

37. The system according to claim 25 wherein the gateway is a DSLAM.

38. The system according to claim 37 wherein the portion of the pathway between the gateway and the subscriber station includes a copper twisted pair.

39. The system according to claim 25 wherein the network is the Internet and the portion of the pathway between the gateway and network is a backhaul.

40. The system according to claim 25 wherein the tester is further operable to be selectively connected to and disconnected from the pathway via a remote instruction from the host.

41. The system according to claim 40 wherein the tester is operable to be selectively connected to and disconnected from the pathway via a manual connection.

42. The system according to claim 40 wherein the gateway is a DSLAM at a telephone central office and the tester is connected to the DSLAM using a manual connection.

43. The system according to claim 25 wherein the tester is further operable to conduct a metal test between the gateway and the subscriber station and wherein the output includes a result of the metal test.

44. The system according to claim 25 wherein the network is the Internet.

45. The system according to claim 44 wherein the at least one connectivity test comprises "pinging" the tester from the host via the Internet.

46. The system according to claim 45 wherein the report includes ping statistics delivered to the host.

* * * * *